US010515149B2

(12) United States Patent
Herr et al.

(10) Patent No.: US 10,515,149 B2
(45) Date of Patent: Dec. 24, 2019

(54) METHOD AND SYSTEM FOR SUGGESTING REVISIONS TO AN ELECTRONIC DOCUMENT

(71) Applicant: BLACKBOILER LLC, Arlington, VA (US)

(72) Inventors: Jonathan Herr, Washington, DC (US); Daniel Edward Simonson, Arlington, VA (US); Daniel P. Broderick, Arlington, VA (US)

(73) Assignee: BLACKBOILER, LLC, Arlington, VA (US)

( * ) Notice: Subject to any disclaimer, the term of this patent is extended or adjusted under 35 U.S.C. 154(b) by 0 days.

(21) Appl. No.: 16/361,781

(22) Filed: Mar. 22, 2019

(65) Prior Publication Data

US 2019/0303435 A1    Oct. 3, 2019

Related U.S. Application Data

(60) Provisional application No. 62/650,607, filed on Mar. 30, 2018.

(51) Int. Cl.
*G06F 17/00* (2019.01)
*G06F 17/27* (2006.01)
(Continued)

(52) U.S. Cl.
CPC ............ *G06F 17/274* (2013.01); *G06F 16/35* (2019.01); *G06F 16/36* (2019.01); *G06F 16/383* (2019.01);
(Continued)

(58) Field of Classification Search
CPC .. G06F 17/2211; G06F 17/2288; G06F 17/24; G06F 17/2775
See application file for complete search history.

(56) References Cited

U.S. PATENT DOCUMENTS 7,519,607 B2    4/2009  Anderson, IV
8,046,372 B1   10/2011  Thirumalai
(Continued)

OTHER PUBLICATIONS

Zhemin Zhu et al, A Monolingual Tree-based Translation Model for Sentence Simplification, Proceedings of the 23rd International Conference on Computational Linguistics (Coling 2010), pp. 1353-1361, Beijing, Aug. 2010.
(Continued)

*Primary Examiner* — Scott T Baderman
*Assistant Examiner* — Barbara M Level
(74) *Attorney, Agent, or Firm* — Rothwell, Figg, Ernst & Manbeck, P.C.

(57) ABSTRACT

A method for suggesting revisions to a document-under-analysis from a seed database, the seed database including a plurality of original texts each respectively associated with one of a plurality of final texts, the method for suggesting revisions including selecting a statement-under-analysis ("SUA"), selecting a first original text of the plurality of original texts, determining a first edit-type classification of the first original text with respect to its associated final text, generating a first similarity score for the first original text based on the first edit-type classification, the first similarity score representing a degree of similarity between the SUA and the first original text, selecting a second original text of the plurality of original texts, determining a second edit-type classification of the second original text with respect to its associated final text, generating a second similarity score for the second original text based on the second edit-type classification, the second similarity score representing a degree of similarity between the SUA and the second original text, selecting a candidate original text from one of the first original text and the second original text, and creating an edited SUA ("ESUA") by modifying a copy of
(Continued)

the first SUA consistent with a first candidate final text associated with the first candidate original text.

20 Claims, 9 Drawing Sheets

(51) Int. Cl.
    *G06F 17/24* (2006.01)
    *G06F 16/36* (2019.01)
    *G06F 16/383* (2019.01)
    *G06F 16/35* (2019.01)

(52) U.S. Cl.
    CPC ........ *G06F 17/241* (2013.01); *G06F 17/2755* (2013.01)

(56) References Cited

U.S. PATENT DOCUMENTS

| | | | |
|---|---|---|---|
| 8,788,523 | B2 | 7/2014 | Martin et al. |
| 8,886,648 | B1 | 11/2014 | Procopio et al. |
| 9,514,103 | B2* | 12/2016 | Kletter ............... G06F 17/2211 |
| 10,127,212 | B1* | 11/2018 | Kim ........................ G06F 17/24 |
| 2002/0002567 | A1* | 1/2002 | Kanie ................... G06F 17/218 715/234 |
| 2004/0102958 | A1* | 5/2004 | Anderson, IV ..... G06F 17/2775 704/4 |
| 2007/0073532 | A1 | 3/2007 | Brockett et al. |
| 2008/0103759 | A1 | 5/2008 | Dolan et al. |
| 2009/0007267 | A1* | 1/2009 | Hoffmann .............. G06Q 10/00 726/22 |
| 2009/0216545 | A1 | 8/2009 | Rajkumar et al. |
| 2015/0347393 | A1* | 12/2015 | Futrell ................ G06F 17/2211 704/9 |
| 2015/0379887 | A1 | 12/2015 | Becker |
| 2016/0012061 | A1 | 1/2016 | Sperling |
| 2016/0055196 | A1* | 2/2016 | Collins ............... G06F 17/2211 707/690 |
| 2016/0224524 | A1* | 8/2016 | Kay ....................... G06F 16/252 |
| 2017/0039176 | A1 | 2/2017 | Broderick et al. |
| 2017/0364495 | A1* | 12/2017 | Srinivasan .......... G06F 17/2288 |
| 2018/0253409 | A1* | 9/2018 | Carlson ............... G06F 17/2765 |
| 2019/0065456 | A1* | 2/2019 | Platow .................. G06F 17/243 |

OTHER PUBLICATIONS

Bill MacCartney, Michel Galley, Christopher D. Manning, A Phrase-Based Alignment Model for Natural Language Inference, Proceedings of the 2008 Conference on Empirical Methods in Natural Language Processing, pp. 802-811, Honolulu, Oct. 2008.
Ion Androutsopoulos and Prodromos Malakasiotis, A Survey of Paraphrasing and Textual Entailment Methods, Journal of Artificial Intelligence Research 38 (2010) 135-187 Submitted Dec. 2009; published May 2010.
Marie-Catherine De Marneffe, Trond Grenager, Bill MacCartney, Daniel Cer, Daniel Ramage, Chlo'e Kiddon, Christopher D. Manning, Aligning semantic graphs for textual inference and machine reading, American Association for Artificial Intelligence, 2006.
Bill MacCartney and Christopher D. Manning, An extended model of natural logic, Proceedings of the 8th International Conference on Computational Semantics, pp. 140-156, Tilburg, Jan. 2009.
Md Arafat Sultan, Steven Bethard and Tamara Sumner, Back to Basics for Monolingual Alignment: Exploiting Word Similarity and Contextual Evidence, Transactions of the Association for Computational Linguistics, 2 (2014) 219-230. Action Editor: Alexander Koller. Submitted Nov. 2013; Revised Jan. 2014; Published May 2014.
Rada Mihalcea, Courtney Corley, Carlo Strapparava, Corpus-based and Knowledge-based Measures of Text Semantic Similarity, American Association for Artificial Intelligence, p. 775-780, 2006.
Rohit J. Kate, A Dependency-based Word Subsequence Kernel, Proceedings of the 2008 Conference on Empirical Methods in Natural Language Processing, pp. 400-409, Honolulu, Oct. 2008.
Yangfeng Ji and Jacob Eisenstein, Discriminative Improvements to Distributional Sentence Similarity, Proceedings of the 2013 Conference on Empirical Methods in Natural Language Processing, pp. 891-896, Seattle, Washington, USA, Oct. 18-21, 2013.
Richard Socher, Eric H. Huang, Jeffrey Pennington, Andrew Y. Ng, Christopher D. Manning, Dynamic Pooling and Unfolding Recursive Autoencoders for Paraphrase Detection, Advances in Neural Information Processing Systems 24, Jan. 2011.
Michael Heilman and Noah A. Smith, Extracting Simplified Statements for Factual Question Generation, Mar. 29, 2010.
Amit Bronner and Christof Monz, User Edits Classification Using Document Revision Histories, Proceedings of the 13th Conference of the European Chapter of the Association for Computational Linguistics, pp. 356-366, Avignon, France, Apr. 23-27, 2012.
Felix Hill, Kyunghyun Cho, Anna Korhonen, Learning Distributed Representations of Sentences from Unlabelled Data, CoRR, abs/1602.03483, 2016, available at: http://arxiv.org/abs/1602.03483.
Shashi Narayan, Claire Gardent. Hybrid Simplication using Deep Semantics and Machine Translation. the 52nd Annual Meeting of the Association for Computational Linguistics, Jun. 2014, Baltimore, United States. pp. 435-445, 2014, Proceedings of the 52nd Annual Meeting of the Association for Computational Linguistics.
Kristian Woodsend and Mirella Lapata, Learning to Simplify Sentences with Quasi-Synchronous Grammar and Integer Programming, Proceedings of the 2011 Conference on Empirical Methods in Natural Language Processing, pp. 409-420, Edinburgh, Scotland, UK, Jul. 27-31, 2011.
Bill MacCartney, Christopher D. Manning, Modeling Semantic Containment and Exclusion in Natural Language Inference, Proceeding COLING '08 Proceedings of the 22nd International Conference on Computational Linguistics—vol. 1 pp. 521-528 Association for Computational Linguistics Stroudsburg, PA, USA, 2008.
Bill MacCartney, Christopher D. Manning, Modeling Semantic Containment and Exclusion in Natural Language Inference (a presentation), Aug. 2008.
Hua He and Jimmy Lin, Pairwise Word Interaction Modeling with Deep Neural Networks for Semantic Similarity Measurement, Proceedings of NAACL-HLT 2016, pp. 937-948, San Diego, California, Jun. 12-17, 2016.
Dr. Radim Rehurek, scalability of semantic analysis in natural language processing, PH.D Thesis, May 2011.
Richard Socher Brody Huval Christopher D. Manning Andrew Y. Ng, Semantic Compositionality through Recursive Matrix-Vector Spaces, Proceedings of the 2012 Joint Conference on Empirical Methods in Natural Language Processing and Computational Natural Language Learning, pp. 1201-1211, Jeju Island, Korea, Jul. 12-14, 2012.
Ilya Sutskever, Oriol Vinyals, Quoc V. Le, Sequence to Sequence Learning with Neural Networks, Advances in neural information processing systems, pp. 3104-3112, 2014.
Ryan Kiros, Yukun Zhu, Ruslan Salakhutdinov, Richard S. Zemel, Antonio Torralba, Raquel Urtasun, Sanja Fidler, Skip-Thought Vectors, arXiv:1506.06726, Jun. 2015.
Radim Rehurek and Petr Sojka, Software Framework for Topic Modeling with Large Corpora, In Proceedings of LREC 2010 workshop New Challenges for NLP Frameworks. Valletta, Malta: University of Malta, 2010. s. 46—50, 5 s. ISBN 2-9517408-6-7.
Samuel R. Bowman, Jon Gauthier, Abhinav Rastogi, Raghav Gupta, Christopher D. Manning, Christopher Potts, A Fast Unified Model for Parsing and Sentence Understanding, arXiv:1603.06021, Mar. 2016.
Xiang Zhang, Yann Lecun, Text Understanding from Scratch, arXiv:1502.01710, Apr. 2016.
Furong Huang, Animashree Anandkumar, Unsupervised Learning of Word-Sequence Representations from Scratch via Convolutional Tensor Decomposition, arXiv:1606.03153, Jun. 2016.
Chambers, N. and Jurafsky, D., "Unsupervised learning of narrative event chains," Proceedings of ACL-08, Columbus, Ohio, Jun. 2008, pp. 789-797.

(56) References Cited

OTHER PUBLICATIONS

Chambers, N. and Jurafsky, D., "Unsupervised learning of narrative schemas and their participants," Proceedings of the 47th Annual Meeting of the ACL and the 4th IJCNLP of the AFNLP, Suntec, Singapore, Aug. 2-7, 2009, pp. 602-610.

Chen, D. and Manning, C. D., "A fast and accurate dependency parser using neural networks," Proceedings of the 2014 Conference on Empirical Methods in Natural Language Processing, Doha, Qatar, Oct. 25-29, 2014, pp. 740-750.

Justeson, J. S. and Katz, S. M., "Technical terminology: some linguistic properties and an algorithm for identification in text," 1995, Natural Language Engineering 1(1):9-27.

Honnibal, M. and Johnson, M., "An improved non-monotonic transition system for dependency parsing," Proceedings of the 2015 Conference on Empirical Methods in Natural Language Processing, Lisbon, Portugal, Sep. 17-21, 2015, pp. 1373-1378.

Petrov, S., et al., "Learning accurate, compact, and interpretable tree annotation," Proceedings of the 21st International Conference on Computational Linguistics and 44th Annual Meeting of the ACL, Sydney, Australia, Jul. 2006, pp. 433-440.

Simonson, D. E., "Investigations of the properties of narrative schemas," a dissertation submitted to the Faculty of the Graduate School of Arts and Sciences of Georgetown University, Washington, DC, Nov. 17, 2017, 259 pages.

Aswani, N., and Gaizauskas, R., "A hybrid approach to align sentences and words in English-Hindi parallel corpora," Jun. 2005, Proceedings of the ACL Workshop on Building and Using Parallel Texts, Association for Computation Linguistics, pp. 57-64.

Manning, C. D., and Schütze, H., Foundations of statistical natural language processing, 1999, The MIT Press, Cambridge, MA, 44 pages.

International Search Report and Written Opinion issued for PCT/US2019/023854 dated Jun. 27, 2019, 17 pages.

* cited by examiner

400

2. Exclusions. The term Confidential Information does not include any information which:

(a) at the time of disclosure is in the public domain or thereafter becomes generally available other than as a result of a breach ~~disclosure~~ by Receiving Party or its Representatives; 401

(b) is available to the Receiving Party or its Representatives on a non-confidential basis from a source other than Disclosing Party, ~~provided that such source is not known by the Receiving Party to be bound by a confidentiality agreement with Disclosing Party; and/or~~ 403

(c) has been independently acquired or developed by Receiving Party or its Representatives without violating any of its obligations under this Agreement <u>and/or</u>

(d) <u>is required to be disclosed in response to a subpoena or a court order duly issued in a judicial or legislative process.</u> 405

3. Confidentiality. Receiving Party agrees to maintain the Confidential Information in confidence and may disclose it only to its directors, officers, employees, agents, <u>investors</u>, representatives, advisors and consultants, parents affiliates, and its affiliates' directors, officers and employees ("Representatives"), whose assistance in evaluating the Confidential Information is necessary and who are legally obligated to maintain the Confidential Information in confidence. ~~Receiving Party agrees to inform its Representatives of the confidential nature of the Confidential Information and further agrees to be liable and responsible to Disclosing Party for any breach of this Agreement by its Representatives.~~ 409 407

4. Ownership. <u>This Agreement shall not be construed as creating, conveying, transferring, granting or conferring upon either party any rights, license or authority in or to the Confidential Information.</u> 411

FIG. 4

METHOD AND SYSTEM FOR SUGGESTING REVISIONS TO AN ELECTRONIC DOCUMENT

CROSS-REFERENCE TO RELATED APPLICATIONS

This application claims priority benefit of U.S. Provisional Application No. 62/650,607, filed on Mar. 30, 2018. Reference is made to U.S. application Ser. No. 15/227,093 filed Aug. 3, 2016, which issued as U.S. Pat. No. 10,216,715 and is a non-provisional of, and claims the priority benefit of, U.S. Prov. Pat. App. No. 62/200,261 filed Aug. 3, 2015; and U.S. application Ser. No. 16/197,769, filed on Nov. 21, 2018, which is a continuation of U.S. application Ser. No. 16/170,628, filed on Oct. 25, 2018. The aforementioned applications are hereby incorporated by reference in their entirety.

STATEMENT REGARDING FEDERALLY SPONSORED RESEARCH OR DEVELOPMENT

This invention was made with government support under NSF 16-599, Award No. 1721878 awarded by the National Science Foundation. The government has certain rights in the invention.

TECHNICAL FIELD

The embodiments of the invention relate to a method and system for revising electronic documents, and more particularly, to a method and system for suggesting edits to an electronic document. Although embodiments of the invention are suitable for a wide scope of applications, it is particularly suitable for suggesting revisions to electronic documents where the suggested revisions are similar to past revisions of similar documents.

BACKGROUND

U.S. Pat. No. 10,216,715 contemplates a method and system for suggesting edits to a document by, generally, breaking a document-under-analysis ("DUA") into many statements-under-analysis ("SUA") and then comparing the SUA's against a "seed database" of past edits to determine if the SUA can be edited in the same way. The seed database of past edits includes "original text" and "final text" representing, respectively, an unedited text and the corresponding edit thereto. The method and system includes, generally, calculating a similarity score between the SUA and each of the "original texts" from the database. For original texts that have a similarity score that exceed a threshold, the SUA and the original text are "aligned" and the edit from the corresponding "final text" is applied to the SUA to produce an edited SUA ("ESUA"). The ESUA can then be inserted into the DUA in place of the SUA. The SUA and corresponding ESUA can then be added to the seed database.

SUMMARY OF THE INVENTION

Some techniques contemplate calculating a similarity score in the same way for each of the original texts and aligning all SUAs and original/final texts in the same way. But a one-size-fits-all approach may not be optimal.

For example, by calculating a similarity score for all original/final texts in the same way, some similarity scores are calculated to be low even though an objective observer would indicate a high degree of similarity. This can happen, for example, when many words have been deleted.

Similarly, the effectiveness of applying edits to the SUA is determined in large part by the alignment of the SUA and the original/final texts. There are many ways to "align" sentences, and some alignments may yield better results for applying edits.

Thus, there is a need to provide a method and system with improved calculation of similarity scores and improved alignment of SUAs and the original/final texts. Accordingly, embodiments of the invention are directed to a method and system for suggesting revisions to an electronic document that substantially obviates one or more of the problems due to limitations and disadvantages of the related art.

An object of embodiments of the invention is to provide an improved similarity score for selecting original texts.

Another object of embodiments of the invention is to provide improved alignment of SUAs and the original/final texts.

Additional features and advantages of embodiments of the invention will be set forth in the description which follows, and in part will be apparent from the description, or may be learned by practice of embodiments of the invention. The objectives and other advantages of the embodiments of the invention will be realized and attained by the structure particularly pointed out in the written description and claims hereof as well as the appended drawings.

To achieve these and other advantages and in accordance with the purpose of embodiments of the invention, as embodied and broadly described, a method and system for suggesting revisions to an electronic document includes selecting a statement-under-analysis ("SUA"), selecting a first original text of the plurality of original texts, determining a first edit-type classification of the first original text with respect to its associated final text, generating a first similarity score for the first original text based on the first edit-type classification, the first similarity score representing a degree of similarity between the SUA and the first original text, selecting a second original text of the plurality of original texts, determining a second edit-type classification of the second original text with respect to its associated final text, generating a second similarity score for the second original text based on the second edit-type classification, the second similarity score representing a degree of similarity between the SUA and the second original text, selecting a candidate original text from one of the first original text and the second original text, and creating an edited SUA ("ESUA") by modifying a copy of the first SUA consistent with a first candidate final text associated with the first candidate original text.

According to some embodiments, a method for suggesting revisions to text data is provided. The method includes the step of obtaining a text-under-analysis ("TUA"). The method includes the step of obtaining a candidate original text from a plurality of original texts. The method includes the step of identifying a first edit operation of the candidate original text with respect to a candidate final text associated with the candidate original text, the first edit operation having an edit-type classification. The method includes the step of selecting an alignment method from a plurality of alignment methods based on the edit-type classification of the first edit operation. The method includes the step of identifying a second edit operation based on the selected alignment method. The method includes the step of creating an edited TUA ("ETUA") by applying to the TUA the second edit operation.

According to some embodiments, a non-transitory computer readable medium is provided, the non-transitory computer readable medium storing instructions configured to cause a computer to perform the method for suggesting revisions to text data.

According to some embodiments, a system for suggesting revisions to text data is provided. The system includes a processor and a non-transitory computer readable memory coupled to the processor. The processor is configured to obtain a text-under-analysis ("TUA"). The processor is configured to obtain a candidate original text from a plurality of original texts. The processor is configured to identify a first edit operation of the candidate original text with respect to a candidate final text associated with the candidate original text, the first edit operation having an edit-type classification. The processor is configured to select an alignment method from a plurality of alignment methods based on the edit-type classification of the first edit operation. The processor is configured to identify a second edit operation based on the selected alignment method. The processor is configured to create an edited TUA ("ETUA") by applying to the TUA the second edit operation.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention.

FIG. 4 illustrates an edited document, according to some embodiments.

DETAILED DESCRIPTION OF THE PREFERRED EMBODIMENTS

Figure 1:
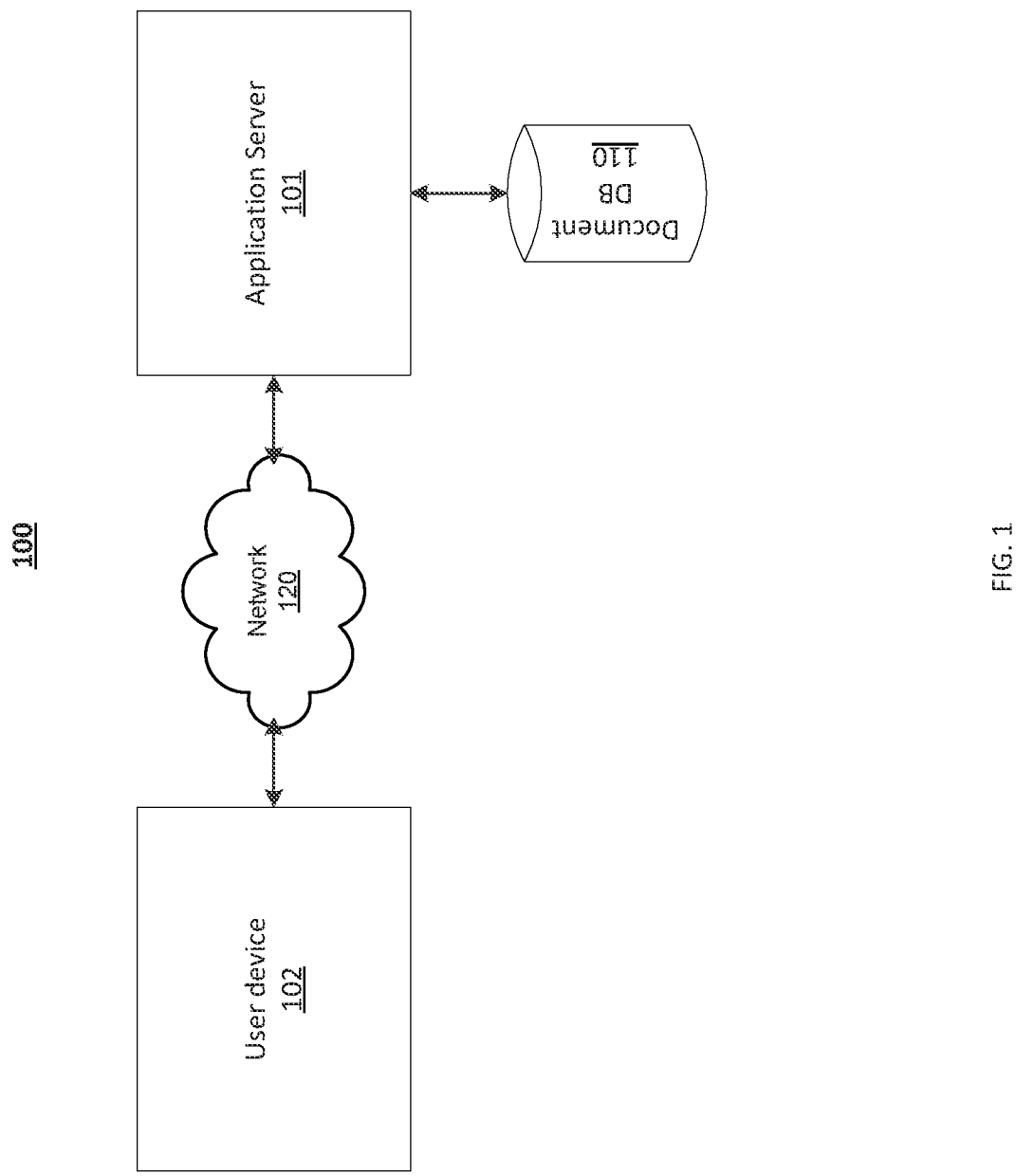
FIG. 1 is a block diagram illustrating a system for suggesting revisions to an electronic document, according to some embodiments.

Reference will now be made in detail to embodiments of the invention, examples of which are illustrated in the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thicknesses of layers and regions are exaggerated for clarity. Like reference numerals in the drawings denote like elements.

U.S. Pat. No. 10,216,715 contemplates calculating similarity scores between SUAs and original texts of a seed database according to a pre-selected similarity metric. Significant research was invested in determining a single "best" metric for determining whether an original text in the seed database was sufficiently similar to the SUA such that the original text's corresponding final text could be coherently applied to the SUA.

In some embodiments, however, there may be no single "best" similarity metric and instead, the optimal metric may vary depending on, among other things, the type of edit that was applied to the original text in the seed database. Thus, according to some embodiments, the "best" similarity metric may be selected in view of the type of edit applied to the original text in the seed database. Moreover, according to some embodiments, the alignment method used between the SUA, original text, and final text may be optimally selected based on the type of edit.

Generally speaking, an "edit operation" means that between the original text and the final text, some text was deleted, replaced, inserted. The concept of "type of edit" refers to the type of edit operation that was performed on the original text in the seed database to get to the final text in the seed database. Non-limiting examples of the "type of edit" can include, for example, a full sentence edit, a parenthetical edit, a single word edit, a structured list edit, an unstructured list edit, or a fronted constituent edit.

A type of edit can be a "full sentence delete" such as deleting the sentence: "In the event disclosing party brings suit to enforce the terms of this Agreement, the prevailing party is entitled to an award of its attorneys' fees and costs."

A type of edit can be a "full sentence replace" such as replacing the sentence "Receipt of payment by the Contractor from the Owner for the Subcontract Work is a condition precedent to payment by the Contractor to the Subcontractor," with "In no event and regardless of any paid-if-paid or pay-when-paid contained herein, will Contractor pay the Subcontractor more than 60 days after the Subcontractor completes the work and submits an acceptable payment application."

A type of edit can be a "full sentence insert," which can be performed after a particular sentence, or a sentence having a particular meaning, for example, taking an original sentence "In the event of Recipient's breach or threatened breach of this Agreement, Disclosing Party is entitled, in addition to all other remedies available under the law, to seek injunctive relief," and inserting after the sentence: "In no event; however, will either Party have any liability for special or consequential damages."

A type of edit can be a "full sentence insert," which can be performed where an agreement is lacking required specificity, for example by adding "The Contractor shall provide the Subcontractor with the same monthly updates to the Progress Schedule that the Contractor provides to the Owner, including all electronic files used to produce the updates to the Progress Schedule."

A type of edit can be a "structured list delete", for example, deleting "(b) Contractor's failure to properly design the Project" from the following structured list: "Subcontractor shall indemnify Contractor against all damages caused by the following: (a) Subcontractor's breach of the terms of this Agreement, (b) Contractor's failure to properly design the Project, and (c) Subcontractor's lower-tier subcontractor's failure to properly perform their work."

A type of edit can be a "structured list insert" such as the insertion of "(d) information that Recipient independently develops" into a structured list as follows: "Confidential Information shall not include (a) information that is in the public domain prior to disclosure, (b) information that Recipient currently possesses, (c) information that becomes available to Recipient through sources other than the Disclosing Party, and (d) information that Recipient independently develops."

A type of edit can be a "leaf list insert" such as inserting "studies" into the following leaf list: "The 'Confidential Information,' includes, without limitation, computer programs, names and expertise of employees and consultants, know-how, formulas, studies, processes, ideas, inventions (whether patent-able or not) schematics and other technical, business, financial, customer and product development plans, forecasts, strategies and information."

A type of edit can be a "leaf list delete" such as deleting "attorneys' fees" from the following leaf list: "Subcontractor shall indemnify Contractor against all damages, fines, expenses, attorneys' fees,-costs, and liabilities arising from Subcontractor's breach of this Agreement."

A type of edit can be a "point delete" such as deleting "immediate" from the following sentence: "Recipient will provide immediate notice to Disclosing Party of all improper disclosers of Confidential Information."

A type of edit can be a "span delete" such as deleting "consistent with the Project Schedule and in strict accordance with and reasonably inferable from the Subcontract Documents" from the following text: "The Contractor retains the Subcontractor as an independent contractor, to provide all labour, materials, tools, machinery, equipment and services necessary or incidental to complete the part of the work which the Contractor has contracted with the Owner to provide on the Project as set forth in Exhibit A to this Agreement, consistent with the Project Schedule and in strict accordance with and reasonably inferable from the Subcontract Documents."

A type of edit can be a "point replace" such as replacing "execute" in the following text with "perform:" "The Subcontractor represents it is fully experienced and qualified to perform the Subcontract Work and it is properly equipped, organized, financed and, if necessary, licensed and/or certified to execute the Subcontract Work."

A type of edit can be a "point insert" such as inserting "reasonably" as follows: "The Subcontractor shall use properly-qualified individuals or entities to carry out the Subcontract Work in a safe and reasonable manner so as to reasonably protect persons and property at the site and adjacent to the site from injury, loss or damage."

A type of edit can be a "fronted constituent edit" such the insertion of "Prior to execution of the Contract" in the following text: "Prior to execution of the Contract, Contractor shall provide Subcontractor with a copy of the Project Schedule."

A type of edit can be an "end of sentence clause insert" such as the insertion of "except as set forth specifically herein as taking precedent over the Contractor's Contract with the Owner" as follows: "In the event of a conflict between this Agreement and the Contractor's Contract with the Owner, the Contractor's Contract with the Owner shall govern, except as set forth specifically herein as taking precedent over the Contractor's Contract with the Owner."

A type of edit can be a "parenthetical delete" such as deleting the parenthetical "(as evidenced by its written records)" in the following text: "The term 'Confidential Information' and the restrictions set forth in Clause 2 and Clause 5 of this Schedule 'B' shall not apply to information which was known by Recipient (as evidenced by its written records) prior to disclosure hereunder, and is not subject to a confidentiality obligation or other legal, contractual or fiduciary obligation to Company or any of its Affiliates."

A type of edit can be a "parenthetical insert" such as the insertion of "(at Contractor's sole expense" in the following text: "The Contractor shall (at Contractor's sole expense) provide the Subcontractor with copies of the Subcontract Documents, prior to the execution of the Subcontract Agreement."

Although many types of edits have been disclosed and described, the invention is not limited to the specific examples of types of edits provided and those of skill in the art will appreciate that other types of edits are possible and therefore fall within the scope of this invention.

FIG. 1 is a block diagram illustrating a system for suggesting revisions to an electronic document 100, according to some embodiments. A user device 102, such as a computer, mobile device, tablet, and the like, may be in communication with one or more application servers 101. In some embodiments, the user device 102 is in communication with application server 101 via a network 120. In some embodiments, network 120 may be a local area network or a wide area network (e.g., the Internet).

In some embodiments, the system 100 may further include one or more data sources, such a document database 110 (sometimes referred to herein as a "seed database"). The document database 110 may be configured to store one or more documents, such as, for example, a DUA. In some embodiments, the document database 110 may be referred to as a "seed database." As described above, the seed database of past edits may comprise "original text" and "final text" representing, respectively, an unedited text and the corresponding edit thereto.

In some embodiments, the user device 102, document database 110, and/or application server 101 may be co-located in the same environment or computer network, or in the same device.

In some embodiments, input to application server 101 from client device 102 may be provided through a web interface or an application programming interface (API), and the output from the application server 101 may also be served through the web interface or API.

While application server 101 is illustrated in FIG. 1 as a single computer for ease of display, it should be appreciated that the application server 101 may be distributed across multiple computer systems. For example, application server 101 may comprise a network of remote servers and/or data sources hosted on network 120 (e.g., the Internet) that are programmed to perform the processes described herein. Such a network of servers may be referred to as the backend of the clause library system 100.

Figure 2:
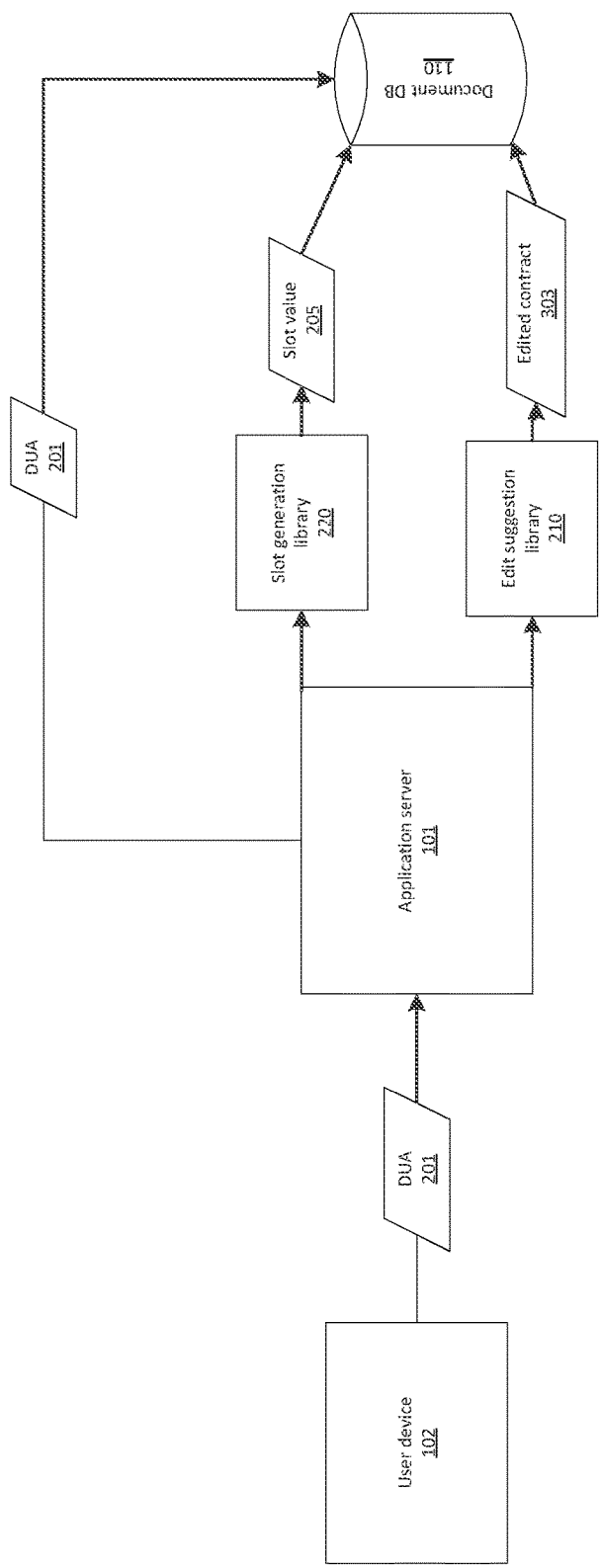
FIG. 2 is a data flow diagram of a document upload process with edit suggestion, according to some embodiments.

FIG. 2 is a data flow diagram of a document upload process with edit suggestion, according to some embodiments. As shown in FIG. 2, a user may upload a previously unseen document, or document under analysis (DUA), 201 to application server 101 using a web interface displayed on user device 102. In some embodiments, the application server 101 stores the received DUA 601 in document database 110.

According to some embodiments, the application server 101 may comprise one or more software modules, including edit suggestion library 210 and slot generation library 220.

Edit suggestion library 210 may comprise programming instructions stored in a non-transitory computer readable memory configured to cause a processor to suggest edits to the DUA 201. The edit suggestion library 210 may perform alignment, edit suggestion, and edit transfer procedures to, inter alia, determine which sentences in a document should be accepted, rejected, or edit, and transfers edits into the document. The application server 101 may store the resulting edited document or set of one or more edits in association with the DUA 201 in document database 110. The edit suggestion features are described more fully in connection with FIGS. 3-7 and 9, described below.

In embodiments where the application server comprises a slot generation library 220, a user may upload a Typical Clause to application server 101 using a web interface displayed on user device 102. In some embodiments, the application server 101 stores the received Typical Clause in a clause library database (not shown in FIG. 2). In some embodiments, slot generation library 220 may comprise programming instructions stored in a non-transitory computer readable memory configured to cause a processor to implement slot generation features as described more fully in co-pending U.S. application Ser. No. 16/197,769, filed on Nov. 21, 2018, which is a continuation of U.S. application Ser. No. 16/170,628, filed on Oct. 25, 2018, the contents of which are incorporated herein by reference. As a result of these processes, the slot generation library 220 may output a set of one or more slot values corresponding to the received DUA. The application server 101 may store such slot values in association with the DUA 201 in document database 110.

In some embodiments, the slot generation library 220 and the edit suggestion library 210 may be used in combination. For example, the edit suggestion library 210 may benefit when used in conjunction with a slot normalization process utilizing slot generation library 220 where the surface form of slot types are replaced with generic terms. During alignment, unseen sentence may be aligned with an optimal set of training sentences for which the appropriate edit operation is known (e.g., accept, reject, edit). However, during alignment, small differences in sentences can tip the similarity algorithms one way or the other. By introducing slot normalization to the training data when it is persisted to the training database, and again to each sentence under analysis, the likelihood of alignment may be increased when terms differ lexically but not semantically (for instance "Information" vs "Confidential Information"). If an edit is required, the edit transfer process may use the normalized slots again to improve sub-sentence alignment. The edit transfer process may search for equal spans between the training sentence and the SUA in order to determine where edits can be made. Slot normalization may increase the length of these spans, thereby improving the edit transfer process. Additionally, suggested edits may be inserted into the DUA 201 with the proper slot value.

The edit suggestion system 100 may comprise some or all of modules 210, 220 as depicted in FIG. 2.

Figure 3:
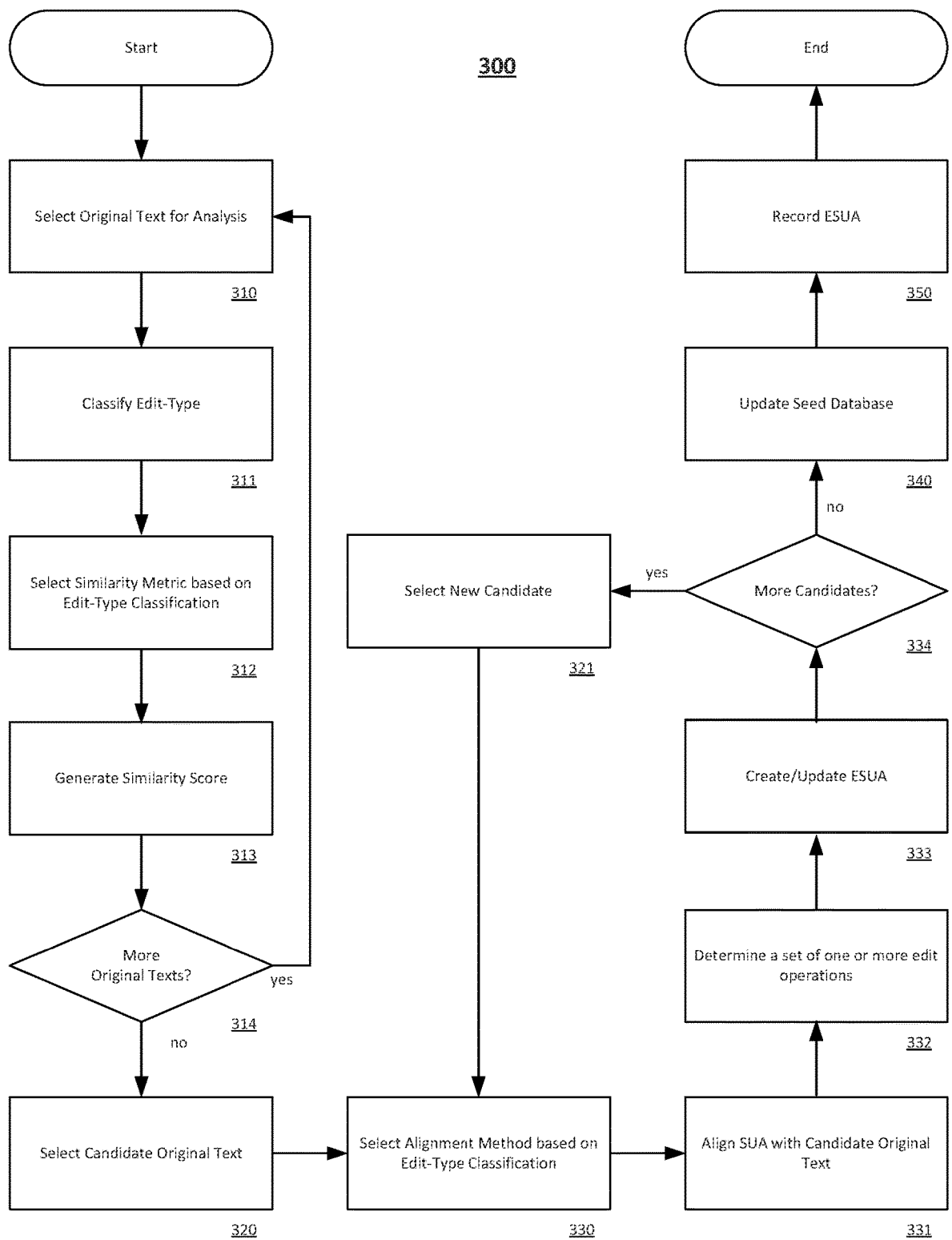
FIG. 3 is a process flow chart for editing a SUA and updating a seed database according to some embodiments.

FIG. 3 is a process flow chart for editing a SUA and updating a seed database according to some embodiments. In some embodiments, process 300 may be performed by edit suggestion system 100 and/or application server 101. As shown in FIG. 3, editing an SUA may comprise selecting an original text from the seed database for analysis 310, classifying an edit-type between the selected original text and the corresponding final text 311, selecting a similarity metric based on the edit-type classification 312, and generating a similarity score 313 between the original text and the SUA. In decision step 314, the process determines whether additional original texts exist for which a similarity score should be calculated. If "yes", the process transitions back to step 310 where a new original text is selected for analysis. If "no" the process transitions to step 320.

The process of editing an SUA may further comprise selecting a candidate original text 320, selecting an alignment method based on the edit-type classification 330, aligning the SUA with the candidate original text according to the selected alignment method 331, determining a set of one or more edit operations according to the selected alignment method 332, and creating or updating the ESUA 333. In decision step 334, the process determines whether there are additional candidate original texts and, if so, a new candidate is selected 321 and the process transitions back to step 330, selecting an alignment method based on edit-type classification. If there are no more candidates in step 334, the process transitions to step 340 where the seed database is updated with the SUA and new ESUA. Finally, the ESUA can be substituted into the DUA in place of the SUA, or the edits may be applied directly to the DUA, in step 350.

In greater detail, in step 310, a first original text can be selected from the seed database for comparison against a SUA. In step 311, the selected original text and its corresponding final text can be classified according to the type of edit that was applied to the original text. The classification of step 311 can occur in real time when an original text is selected for analysis. In the alternative, the classification of step 311 can occur as part of the creation of the seed database. In some embodiments, the classification step 311 may further include classifying a potential edit type based on the text of the SUA in the case of, for example, a leaf list and structured list edit. An example classification procedure is described in further detail below and in connection with FIG. 4.

In step 312, a similarity metric can be selected based on the type of edit. For example, the cosine distance algorithm can provide a good measure of similarity between an original text and an SUA for a single word insert. Thus, for entries in the seed database of a single word insert the process can advantageously select the cosine distance algorithm to determine the degree of similarity between the SUA and the original text. In another example, edit distance can provide a good measure of similarity between an original text and an SUA for a full sentence delete. Thus, for entries in the seed database of a full sentence delete, the process can advantageously select edit distance to determine the degree of similarity between the SUA and the original text.

In step 313, a similarity score for the selected original text and the SUA is calculated based on the selected similarity metric for that edit type. In step 314, the process determines if there are additional original texts to be analyzed for similarity. In the example of a seed database there are typically many original texts to analyze and the process loops back to step 310 until all the original texts have been analyzed and a similarity score generated.

In some embodiments, a text under analysis (TUA) may be used for alignment, which comprises a window of text from the DUA, which may span multiple sentences or paragraphs, where a full edit operation may be performed. Full edit types may rely on a similarity metric calculated over a window of text before and/or after the original text and a set of such windows from the DUA. The window from the DUA with the highest score as compared to the original text's window becomes the text under analysis (TUA) into which the full edit operation is performed, producing the full edit, which may be the deletion of all or part of the TUA or the insertion of the final text associated with the original text. In some embodiments, a window of text is extracted from the original texts' document context. That window is then used to search the DUA for a similar span of text. The original text with the highest similarity value, according to one or more similarity metrics (such as cosine distance over TF/IDF, word count, and/or word embeddings for those pairs of texts), on the window of text may be selected.

In some embodiments, once a span edit, such as the deletion of a parenthetical or other short string longer than a single word, is detected, the best original text from among the set of aligned original texts may be selected. A Word Mover Distance similarity metric may be used to compare the deleted span with spans in the TUA and the original text with the nearest match to a span in the TUA is selected. This allows semantically similar but different spans to be aligned for editing. In some embodiments, span edits may rely on a Word Embedding based similarity metric to align semantically related text spans for editing. The relevant span of the original text is compared to spans of the TUA such that semantically similar spans are aligned where the edit operation could be performed.

In step 320, a candidate original text can be selected. The candidate can be selected based on the similarity score calculated in step 313. There can be multiple candidate original texts. For example, in step 320, the original text having the highest similarity score, or an original text exceeding some threshold similarity score, or one of the original texts having the top three similarity scores may be selected. Selecting a candidate original text in this step 320 may consider other factors in addition to the similarity score such as attributes of the statement under analysis. In any event, each original text that meets the selection criteria can be considered a candidate original text.

In step 330, an alignment method can be selected based on the edit-type classification for the selected candidate original text. Improved alignment between the SUA, original text, and final text can be achieved when the alignment method is selected based on the edit-type classification rather than employing a single alignment method for all alignments. For example, a longest-matching substring can provide a good alignment between an original text and an SUA for a single word insert. Thus, for entries in the seed database of a single word insert, the process can advantageously select longest matching substring to align the SUA and the original text. In another example, a constituent-subtree alignment can provide a good alignment between an original text and an SUA for a structured-list insert. Thus, for entries in the seed database of structured-list insert the process can advantageously select a constituent-subtree alignment to align the SUA and the original text. Additional alignment methods are described in further detail below.

In step 331 the SUA and the candidate original text are aligned according to the alignment method selected in step 330. In step 332, a set of one or more edit operations is determined according to the alignment method selected in step 330. In some embodiments, the set of one or more edit operations may be determined by aligning the candidate original text with its associated final text according to the alignment method selected in step 330, and determining a set of one or more edit operations that convert the aligned original text to the aligned final text. In such embodiments, in step 333 the SUA is created by applying the set of one or more edit operations.

In some embodiments, in step 332, the set of one or more edit operations may be determined by determining a set of edit operations that convert the SUA to the final text associated with the original text. In such embodiments, in step 333 the SUA is created by applying to the SUA one or more edit operations from the set of one or more edit operations according to the alignment method.

Step 334 can be consistent with multiple alignment, that is, where a SUA is aligned and is edited in accordance with multiple original/final texts from the seed database. In step 334, it can be determined whether there are additional candidate original texts that meet the selection criteria (e.g. exceed a similarity score threshold, top three, etc). If "yes" the process proceeds to step 321 where a new candidate original text is selected. If no, the process can proceed to step 340.

In step 340, the seed database can be updated with the SUA and the ESUA which, after adding to the seed database would be considered an "original text" and a "final text," respectively. In this way, the methods disclosed herein can learn from new DUAs and new SUAs by adding to its seed database.

In some embodiments, there may also be a step between 334 and 340 where a human user reviews the proposed ESUA of the EDUA to (a) accept/reject/revise the proposed revisions or (b) include additional revisions. This feedback may be used to improve the similarity score metrics (e.g., by training the system to identify similar or dissimilar candidate original texts) and/or the suggested edit revision process (e.g., by training the system to accept or reject certain candidate alignments) for specific user(s) of the system 100.

In step 350 the ESUA can be recorded back into the DUA in place of the SUA, or the edit can be applied to the text of the DUA directly.

Training Data Creation

It is contemplated that potential users of the invention may not have a large database of previously edited documents from which to generate the seed database. To address this limitation, embodiments of the invention include generating a seed database from documents provided by a third party or from answering a questionnaire. For example, if a user is a property management company that does not have a sufficient base of previously edited documents from which to generate a seed database, embodiments of the invention may include sample documents associated with other property management companies or publicly available documents (e.g. from EDGAR) that can be used to populate the seed database.

In another example, if a user does not have a sufficient base of previously edited documents from which to generate a seed database, embodiments of the invention may ask legal questions to the user to determine a user's tolerance for certain contractual provisions. In greater detail, during a setup of the invention, the user may be asked, among other things, whether they will agree to "fee shifting" provisions where costs and attorneys' fees are borne by the non-prevailing party. If yes, the invention can populate the seed database with original/final texts consistent with "fee shifting," e.g., the original and final texts contain the same fee shifting language. If not, the invention can populate the seed database with original/final texts consistent with no "fee shifting," e.g., the original text contains fee shifting language and the final text does not contain fee shifting language.

FIG. 4 illustrates an edited document, according to some embodiments. As shown in FIG. 4, edited document 400 may comprise an Open Document Format (ODT) or Office Open XML (OOXML) type document with tags representing portions of the original document that have been revised by an editor. In some embodiments, the tags may comprise "Track-Changes" tags as used by certain document editing platforms.

As shown FIG. 4, edited document 400 may comprise a plurality of classified edits, such as a point edit (401); a chunk delete (403); a list item insert (405); a leaf list insert (407); a full sentence delete (409); and a paragraph insert (411). Additional edits not shown in edited document 400 may comprise, e.g., a span edit and a full sentence insert.

Edit Suggestion System 100 may ingest a document 400 by traversing its runs in order. In some embodiments, a "run" may refer to the run element defined in the Open XML File Format. Every run may be ingested and added to a string representing the document in both its old (original) and new (edited/final) states. The system 100 may note, for each subsequence reflecting each run, whether each subsequence appears in the old and new states. A subsequence may comprise, for example, an entire document, paragraphs, lists, paragraph headers, list markers, sentences, sub-sentence chunks and the like. This list is non-exhaustive, and a person of ordinary skill in the art may recognize that additional sequences of text, or structural elements of text documents, may be important to capture.

A set of strings may be assembled from each subsequence, where one string in the set reflects an old state (e.g., original text) and a second string in the set reflects a new state (e.g., final or edited text). In some embodiments, each string is processed to identify linguistic features, such as word boundaries, parts of speech, list markets, list items, paragraph/clause headers, and sentence/chunk boundaries. In some embodiments, the system requires identification of sentence boundaries for alignments. However, the system may determine these linguistic features statistically; as a result, small changes in the data can result in big changes in the boundaries output. Therefore, it may be necessary to create a merger of all sentences where, given overlapping but mismatched spans of text, spans representing the largest sequences of overlap are retained.

Once this merger of all sentences has been determined, the set of merged sentences may be used to identify whether one or more edit types have occurred. Such edit types may include, for example, a full edit (e.g., sentence or paragraph), list edit (structured or leaf list), chunk edit, point edit, or span edit, among others.

In some embodiments, in order to identify full paragraph edits, the system first determines, for strings corresponding to a paragraph in document 400, whether there are characters in both the old and new states. If the old state has no characters and the new state does, that is a full paragraph insert (FPI); if the new state has no characters and the old state does, that is a full paragraph delete (FPD).

In some embodiments, in order to identify full sentence edits, for each sentence or special sentence in a paragraph, the system attempts to pair each sentence in each state (e.g., original) with a sentence in the other state (e.g., final). If the pairing succeeds, then no full change occurred. If the pairing fails for a sentence in the old state (e.g., original), the sentence is tagged as a full sentence delete (FSD); if the pairing fails for a sentence in the new state (e.g., final), the sentence is tagged as a full sentence insert (FSI).

In some embodiments, in order to identify full chunk edits, for each sentence or special sentence in a paragraph, the system attempts to pair each constituent in each state (e.g., original) with a chunk in the other state (e.g., final). If the pairing succeeds, then no full change occurred. If the pairing fails for a chunk in the old state (e.g., original), the chunk is tagged as a full chunk delete (FCD); if the pairing fails for a chunk in the new state (e.g., final), the chunk is tagged as a full chunk insert (FCI).

In some embodiments, in order to identify structured list edits, the system attempts to pair list items in a structured list in each state (e.g., original) with a list item in the other state (e.g., final). If the pairing succeeds, then no structured list edit occurred. If the pairing fails for a list item in the old state (e.g., original), the list item is tagged as an List Item Delete; if the pairing fails for a list item in the new state (e.g., final), the list item is tagged as a List Item Insert.

In some embodiments, if the new state (e.g., original) and the old state (e.g., final) are equal, then the string of text is labeled as an "accept."

In some embodiments, if the new state and the old state are not equal, but the change is not a "Full Edit" (e.g., FPD, FPI, FSD, or FSI), the string of text is labeled as a "revise." Revises may be labeled as either "Point Edits" or "Span Edits." Point Edits are insertions, single word replaces, and single word deletes. Span Edits are multi word deletes and multi word replaces. In some embodiments, a revise may be labelled as a "Full Edit" (e.g., FPD, FPI, FSD, or FSI).

In some embodiments, unstructured, syntactically coordinated natural language lists are identified with a regular pattern of part-of-speech tags, sentence classifications, and other features that are indicative of a list, manually tuned to fit such sequences.

For example, one embodiment of such a pattern may be: D?N+((N+),)*CN+; where D represents a token tagged as a determiner, N represents a token tagged as a noun, C represents a token tagged as a conjunction, and "," represents comma tokens. Sequences that would match such a pattern include, for example: (i) any investor, broker, or agent; (ii) investor, broker, or agent; (iii) investor, stock broker, or agent; and (iv) all brokers or agents.

In some embodiments, additional information may be captured as part of the training process. For example, text classification (e.g., fee shifting; indemnification; disclosure required by law) may assist with augmenting the training data. The additional information may assist with creating a seed database through a question and answer system. Another example may include identifying choice of law SUA(s), and then identifying the jurisdictions or states within those provision (e.g., New York, Delaware), which may help with a question and answer learning rule such as always change the choice of law to New York. Another example may include classifying "term" clauses and durations in such clauses in order to learn rules about preferred durations.

Point Edit Type Alignment

Figure 5:
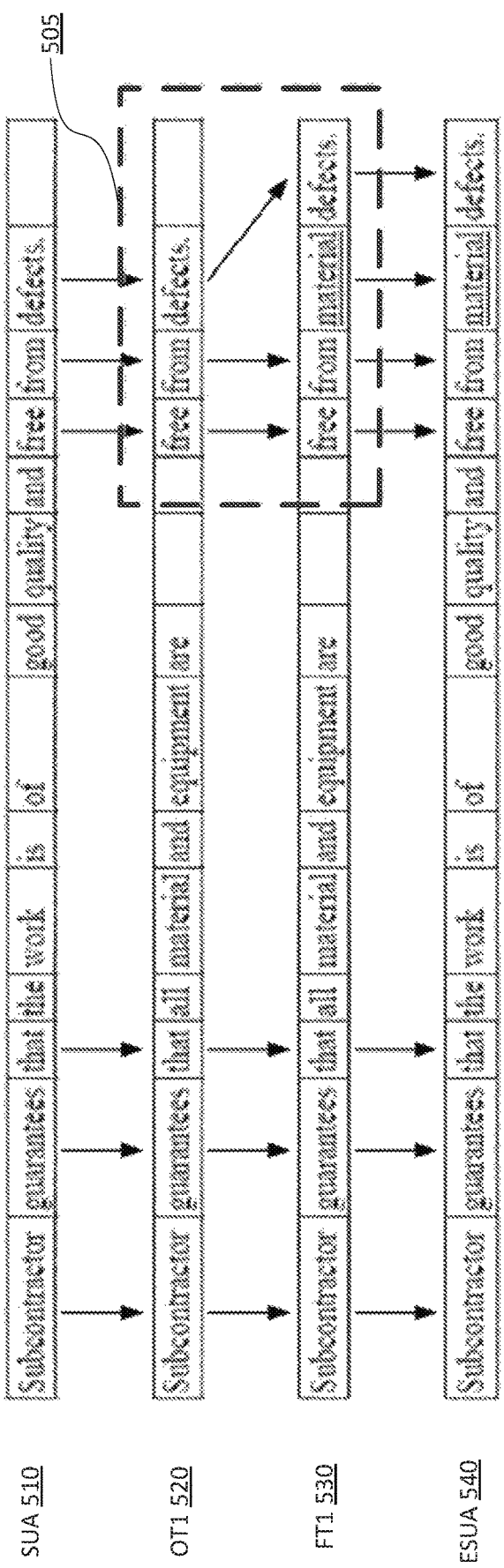
FIG. 5 is an illustration of a point edit-type alignment according to some embodiments.

FIG. 5 is an illustration of a point edit-type alignment according to some embodiments. As shown in FIG. 5, the statement under analysis (SUA 510) is matched with a candidate original text (OT1 520) based on a similarity score as described above. As highlighted in box 505, there is a point edit type between the original text (OT1 520) and the final text (FT1 530) because of the insertion of the word "material" into the final text (FT1 530). Accordingly, an alignment method applicable for a point edit may be selected as shown in FIG. 5.

In some embodiments, the selected alignment may comprise aligning the SUA 510 to the original text "OT1" 520, aligning a corresponding final text "FT1" 530 to the original text 520, determining one or more edit operations to transform the original text "OT1" 520 into the final text "FT1" 530 according to the alignment (e.g., insertion of the word "material"), and creating the ESUA 540 by applying the one or more edit operations to the statement under analysis "SUA" 520.

In other embodiments, the selected alignment may comprise aligning the SUA 510 to the original text "OT1" 520, obtaining a corresponding final text "FT1" 530, determining a set of one or more edit operations to transform the SUA 510 into the FT1 530, and applying to the SUA 510 the one or more edit operations consistent with the first alignment (e.g., insertion of the word "material").

These alignment techniques are disclosed more fully in U.S. application Ser. No. 15/227,093 filed Aug. 3, 2016, which issued as U.S. Pat. No. 10,216,715, and U.S. application Ser. No. 16/197,769, filed on Nov. 21, 2018, which is a continuation of U.S. application Ser. No. 16/170,628, filed on Oct. 25, 2018, which are hereby incorporated by reference in their entirety.

Semantic Alignment

Figure 6:
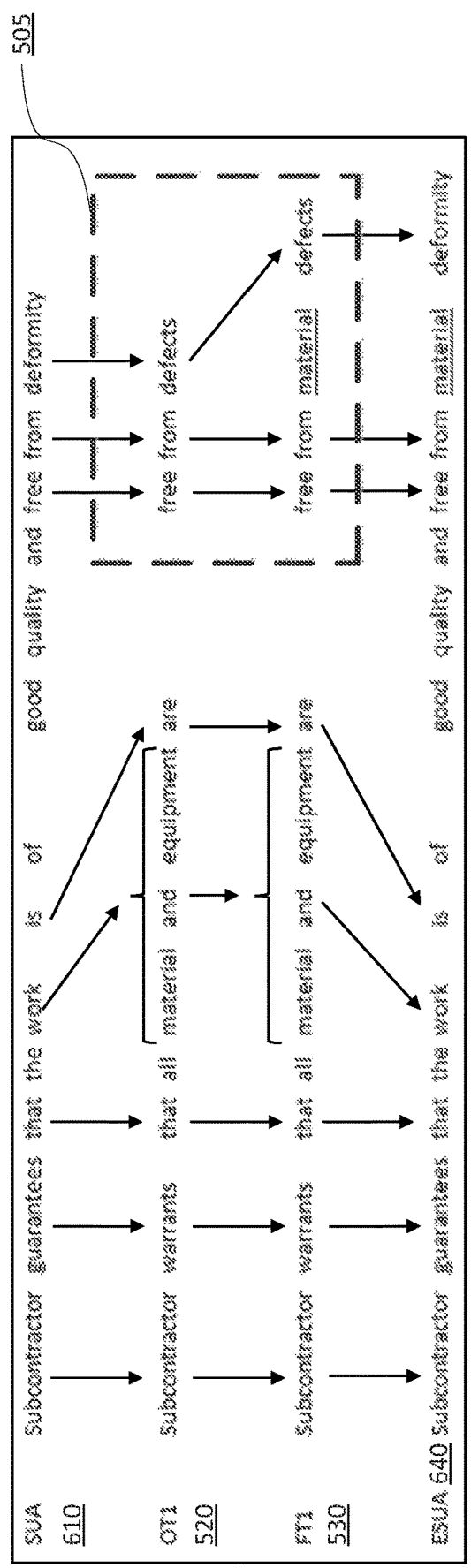
FIG. 6 is an illustration of a point edit-type alignment according to some embodiments.

FIG. 6 is an illustration of a point edit-type alignment according to some embodiments. In some embodiments, the alignment procedures described above in connection with FIG. 5 and elsewhere herein do not require exact overlaps. For example, FIG. 6 illustrates SUA 610, which is nearly identical to SUA 510 in FIG. 5 except for the substitution of the word "defect" for "deformity."

According to some embodiments, the training data is augmented to generate additional instances of sentences that are changed to use, e.g., paraphrases of words and phrases in the training sentence. Additional features of the training sentences may be extracted from document context and used to enhance alignment and support different edit types. Example features may include word embeddings for sentence tokens, user, counterparty, edit type, and edit context (e.g., nearby words/phrases). Augmentation of the training data in this manner may allow the system to perform semantic subsentence alignment, e.g., by enabling subsentence similarity tests to consider semantic similarity based on word embeddings.

Semantic subsentence alignment may enable the point edit type alignment procedure as disclosed above in connection with FIG. 5 to work when exact overlaps are not available—for example, 'defects' vs 'deformity' as shown in FIG. 6. Referring to FIG. 6, the statement under analysis (SUA 610) may be matched with the same candidate original text (OT1 520) based on a similarity score as described above. As highlighted in box 505, there is a point edit type between the original text (OT1 520) and the final text (FT1 530) because of the insertion of the word "material" into the final text (FT1 530). In view of the point edit type 505, the system may proceed with performing the point edit type alignment procedure described above in connection with FIG. 5 in addition to semantic subsentence alignment. For example, using semantic subsentence alignment, the system is able to align "deformity" recited in SUA 610 with "defects" recited in OT1 520, as indicated by the arrows, and recognize the point edit operation of inserting the term "material" into the ESUA 640.

Span Edit Type Alignment

Figure 7:
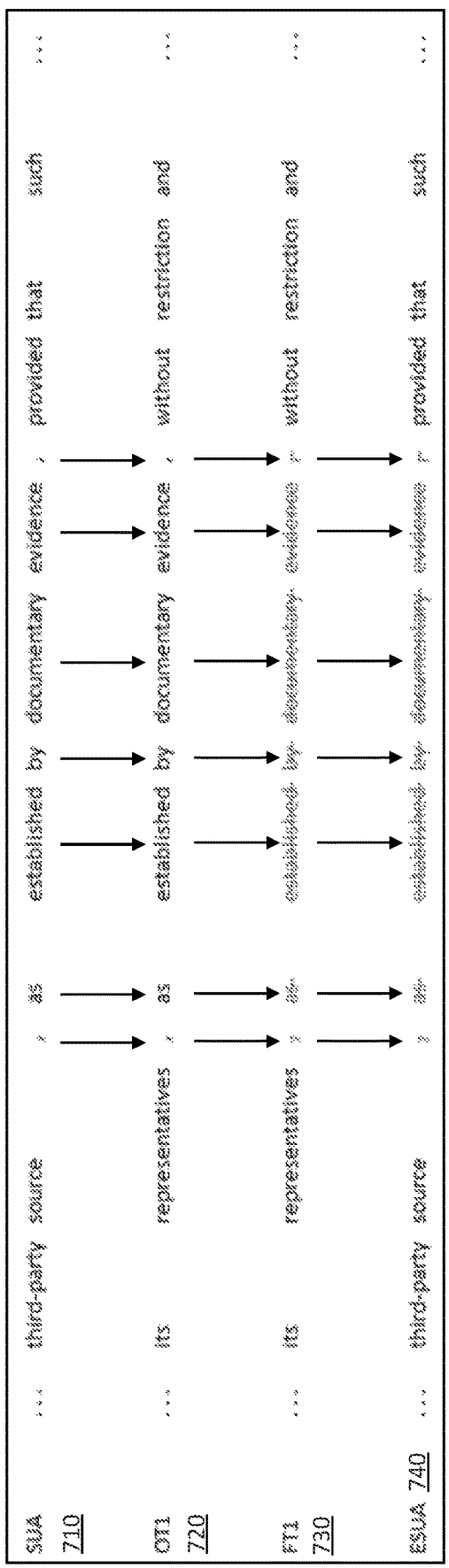
FIG. 7 is an illustration of a span edit-type alignment according to some embodiments.

In some embodiments, span delete edit types might not require an alignment of the text the surrounds the deleted text. For example, Table A below depicts an example where a SUA has a high similarity score with a four different original texts because of the inclusion of the clause "as established by documentary evidence." Each original text has a "SPAN" edit type operation as reflected by the deletion of the "as established by documentary evidence" between each Original Text and its respective Final Text. In this example, and as shown in FIG. 7, an alignment of the text surrounding the deleted phrase is unnecessary.

TABLE A

| SUA | Original Text | Final Text | Edit Op. | ESUA |
|---|---|---|---|---|
| (b) . . . available to the Recipient on a non-confidential basis from a third-party source, as established by documentary evidence, provided that such third party is not . . . | (b) Such Proprietary Information is already in the possession of the Receiving Party or its representatives, as established by documentary evidence, without restrict and prior to any disclosure hereunder | (b) Such Proprietary Information is already in the possession of the Receiving Party or its representatives without restrict and prior to any disclosure hereunder | SPAN | (b) . . . available to the Recipient on a non-confidential basis from a third-party source provided that such third party is not . . . |
| (b) . . . available to the Recipient on a non-confidential basis from a third-party source, as established by documentary evidence, provided that such third party is not . . . | d. is, as established by documentary evidence, independently developed by the Receiving Party. | d. is-independently developed by the Receiving Party. | SPAN | (b) . . . available to the Recipient on a non-confidential basis from a third-party source provided that such third party is not . . . |
| (b) . . . available to the Recipient on a non- | (iii) was already in the possession of the Recipient or its | (iii) was already in the possession of the Recipient or its | SPAN | (b) . . . available to the Recipient on a non-confidential |

TABLE A-continued

| SUA | Original Text | Final Text | Edit Op. | ESUA |
|---|---|---|---|---|
| confidential basis from a third-party source, as established by documentary evidence, provided that such third party is not . . . | Representatives, as established by documentary evidence, on a non-confidential basis from a source other than the Disclosing Parties prior to the date hereof | Representatives-on a non-confidential basis from a source other than the Disclosing Parties prior to the date hereof | | basis from a third-party source provided that such third party is not . . . |
| (b) . . . available to the Recipient on a non-confidential basis from a third-party source, as established by documentary evidence, provided that such third party is not . . . | (c) was lawfully acquired by the Recipient from a third party, as established by documentary evidence, and not subject to any obligation of confidence to the party furnishing the Confidential Information. | (c) was lawfully acquired by the Recipient from a third party-and not subject to any obligation of confidence to the party furnishing the Confidential Information. | SPAN | (b) . . . available to the Recipient on a non-confidential basis from a third-party source-provided that such third party is not . . . |

FIG. 7 is an illustration of a span edit-type alignment according to some embodiments. As shown by the arrows in FIG. 7, an alignment of the text surrounding the deleted phrase "as established by documentary evidence" is not necessary. Namely, where the SUA (710) and an OT1 (720) are above a certain similarity threshold, and the SUA (710) contains the same text as the OT1 (720) that was deleted (or replaced) to arrive at the FT1 (730), the same text present in the SUA (710) may be deleted to arrive at the ESUA (740). For example, as shown in FIG. 7, since there is the same text ", as established by documentary evidence," in SUA (710) and OT1 (720), and there is a span delete edit type between OT1 (720) and FT1 (730) for that same text, then the system arrives at the ESUA (740) by deleting the same text from SUA (710).

In some embodiments, the training data augmentation process described above may also be used to enhance alignment and support span edits. For example, semantic subsentence alignment may enable the span edit type alignment procedure as disclosed above in connection with FIG. 7 to work when exact overlaps are not available.

According to some embodiments, span edits may rely heavily on two factors: (1) sentence or paragraph context, and (2) edit frequency. As part of the alignment process, the system may first extract candidate original text matches against a SUA as described above, and the candidate original text may indicate that a span edit is required based on the associated final candidate text. Next, the system may cluster span edits across all available training data (e.g., original and final texts) to find a best match for the SUA's context.

In some embodiments, the system may choose from the cluster the best span edit to make in this context. The selection may be based on some combination of context (words nearby) and frequency of the edit itself (e.g. how often has the user deleted a parenthetical that has high similarity to the one in the selected original text, within this context and/or across contexts). In some embodiments, if the selection is not the same as the best matching (similar) original text, the system may replace that selection with an original text with a higher similarity score.

Once the candidate original text is selected, the system may apply the edit using the alignment procedures described herein. An example of the semantic alignment as applied for a span delete is shown below in Table B.

TABLE B

| SUA | Original Text | Final Text | Edit Op. | ESUA |
|---|---|---|---|---|
| (b) . . . available to the Recipient on a non-confidential basis from a third-party source, as established by documentary evidence, provided that such third party is not . . . | (iv) is independently developed by the receiving party without reference to the Confidential information of the other party, which can be demonstrated by written record. | (iv) is independently developed by the receiving party without reference to the Confidential information of the other party. | SPAN | (b) . . . available to the Recipient on a non-confidential basis from a third-party source provided that such third party is not . . . |
| (b) . . . available to the Recipient on a non-confidential basis from a third-party | (iii) was already in the possession of the Recipient or its Representatives (as demonstrated by written records) on | (iii) was already in the possession of the Recipient or its Representatives on a non-confidential basis from a source | SPAN | (b) . . . available to the Recipient on a non-confidential basis from a third-party source provided that such |

TABLE B-continued

| SUA | Original Text | Final Text | Edit Op. | ESUA |
|---|---|---|---|---|
| source, as established by documentary evidence, provided that such third party is not . . . | a non-confidential basis from a source other than the Disclosing Parties prior to the date hereof . . . | other than the Disclosing Parties prior to the date hereof . . . | | third party is not . . . |
| (b) . . . available to the Recipient on a non-confidential basis from a third-party source, as established by documentary evidence, provided that such third party is not . . . | (c) was lawfully acquired by the Recipient from a third party (as evidenced in the Recipient's written records) and not subject to any obligation of confidence to the party furnishing the Confidential Information. | (c) was lawfully acquired by the Recipient from a third party and not subject to any obligation of confidence to the party furnishing the Confidential Information. | SPAN | (b) . . . available to the Recipient on a non-confidential basis from a third-party source provided that such third party is not . . . |

Full Edit Type Alignment

In some embodiments where the edit type comprises a full sentence insert (FSI), an alignment method may be selected based on the FSI edit type. Each SUA is compared to semantically similar original texts. If one of the original texts is labeled with an FSI edit operation, then that same FSI edit operation that was applied to the original text is applied to the SUA. An example of this alignment method for FSI edit operations is shown in Table C, below.

TABLE C

| SUA | Original Text | Final Text | Edit Op. | ESUA |
|---|---|---|---|---|
| Therefore, the Receiving Party agrees that the Disclosing Party shall be entitled to seek injunctive and/or other equitable relief, in addition to any other remedies available at law or equity to the Disclosing Party. | Any relief is in addition to and not in replace of any appropriate relief in the way of monetary damages. | Any relief is in addition to and not in replace of any appropriate relief in the way of monetary damages. Neither Party shall be liable for consequential damages. | FSI | Therefore, the Receiving Party agrees that the Disclosing Party shall be entitled to seek injunctive and/or other equitable relief, in addition to any other remedies available at law or equity to the Disclosing Party. Neither Party shall be liable for consequential damages. |
| Therefore, the Receiving Party agrees that the Disclosing Party shall be entitled to seek injunctive and/or other equitable relief, in addition to any other remedies available at law or equity to the Disclosing Party. | Therefore, the Disclosing Party shall be entitled to seek equitable or injunctive relief, in addition to other remedies to which it may be entitled at law or equity. | Therefore, the Disclosing Party shall be entitled to seek equitable or injunctive relief, in addition to other remedies to which it may be entitled at law or equity. Notwithstanding the foregoing, neither Party shall be liable for consequential damages. | FSI | Therefore, the Receiving Party agrees that the Disclosing Party shall be entitled to seek injunctive and/or other equitable relief, in addition to any other remedies available at law or equity to the Disclosing Party. Neither Party shall be liable for consequential damages. |
| Therefore, the Receiving Party agrees that the Disclosing Party shall be entitled to seek injunctive and/or other equitable relief, in addition to any other | Such remedies shall not be deemed to be the exclusive remedies for breach of this Agreement, but shall be in addition to all other remedies available at law or in equity. | Such remedies shall not be deemed to be the exclusive remedies for breach of this Agreement, but shall be in addition to all other remedies available at law or in equity. Neither Party shall be liable for | FSI | Therefore, the Receiving Party agrees that the Disclosing Party shall be entitled to seek injunctive and/or other equitable relief, in addition to any other remedies available at law or |

TABLE C-continued

| SUA | Original Text | Final Text | Edit Op. | ESUA |
|---|---|---|---|---|
| remedies available at law or equity to the Disclosing Party. | | consequential damages. | | equity to the Disclosing Party. Neither Party shall be liable for consequential damages. |

In some embodiments, if a single SUA triggers multiple FSI(s), semantically similar FSI(s) may be clustered together so that multiple FSIs aren't applied to the same SUA.

In some embodiments, the text of the paragraph/document/etc. can also be searched for semantically similar text to the FSI in order to ensure that the FSI isn't already in the DUA. A similar process can be used for full paragraph insertions and list editing. For example, where there is a full paragraph insertion edit operation indicated by the selected candidate original text, the system may check to make sure that the paragraph (or the context of the inserted paragraph) is not already in the DUA.

FSI may be added to the DUA in a location different from the SUA that triggered the FSI. In some embodiments, when an original text is an FSI and is selected as matching to the SUA, all similar FSI are also retrieved from the seed database. The document context is then considered to determine if any of that set of FSI's original texts are preferred, by frequency, over the SUA that triggered the FSI. If this is the case, and that original text or significantly similar text, occurs in the DUA, the FSI is placed after that new SUA, rather than the triggering SUA.

In some embodiments, another alignment method may be chosen where the edit type is a full sentence delete (FSD). Each SUA may be compared to semantically similar original texts. If one of the original texts is labeled with an FSD edit operation, then that same FSD edit operation that was applied to the original text is applied to the SUA. This same process can be done at the sentence, chunk, paragraph, etc. level, and an example of this alignment method for a FSD edit operation is shown in Table D below.

TABLE D

| SUA | Original Text | Final Text | Edit Op. | ESUA |
|---|---|---|---|---|
| If either Disclosing Party or Receiving Party employs legal counsel to enforce any rights arising out of or relating to this Agreement, the prevailing party shall be entitled to recover reasonable attorney's fees and costs. | If either party employs attorneys to enforce any rights arising out of or relating to this Agreement, the prevailing party shall be entitled to recover reasonable attorneys' fees and expenses. | | FSD | |
| If either Disclosing Party or Receiving Party employs legal counsel to enforce any rights arising out of or relating to this Agreement, the prevailing party shall be entitled to recover reasonable attorney's fees and costs. | The prevailing Party in any action to enforce this Agreement shall be entitled to costs and attorneys' fees. | | FSD | |
| If either Disclosing Party or Receiving Party employs legal counsel to enforce any rights arising out of or relating to this Agreement, the prevailing party shall be entitled to recover reasonable attorney's fees and costs. | The prevailing Party in any action to enforce this Agreement shall be entitled to all costs, expenses and reasonable attorneys' fees incurred in bringing such action. | | FSD | |
| If either Disclosing Party or Receiving Party employs legal counsel to enforce any rights arising out of or relating to this Agreement, the prevailing party shall be entitled to recover reasonable attorney's fees and costs. | Company agrees to reimburse Disclosing Party and its Representatives for all costs and expenses, including reasonable attorneys' fees, incurred by them in enforcing the terms of this Agreement. | | FSD | |

In some embodiments where there is a full paragraph edit type, an alignment method may be selected based on the full paragraph edit type. For example, in the case of a full paragraph insert, the system may cluster typically inserted paragraphs from training data/original texts according to textual similarity. The system may then select the most appropriate paragraph from the training data clusters by aligning paragraph features with the features of the DUA. Paragraph features may include information about the document that the paragraph was extracted from originally, such as, for example: counterparty, location in the document, document v. document similarity, nearby paragraphs, etc. In some embodiments, the system may further perform a presence check for the presence of the selected paragraph or highly similar paragraphs or text in the DUA. In some embodiments, the system may insert a paragraph using paragraph features in order to locate the optimal insertion location.

In some embodiments, another alignment method may be chosen where the edit type is a full paragraph delete (FPD). Each SUA may be compared to semantically similar original texts. If one of the original texts is labeled with an FPD edit operation, then that same FPD edit operation that was applied to the original text is applied to the SUA.

An example of this alignment method for a FPD edit operation is shown in Table E below.

TABLE E

| SUA | Original Text | Final Text | Edit Op. | ESUA |
|---|---|---|---|---|
| Each party recognizes that nothing in this Agreement is intended to limit any remedy of the other party. In addition, each party agrees that a violation of this Agreement could cause the other party irreparable harm and that any remedy at law may be inadequate, Therefore, each party agrees that the other party shall have the right to an order restraining any breach of this Agreement and for any other relief the non-breaching party deems appropriate. | 11. Because an award of money damages would be inadequate for any breach of this Agreement by the Receiving Party, the Receiving Party agrees that in the event of any breach of this Agreement, the Disclosing Party shall also be entitled to equitable relief. Such remedies shall not be the exclusive remedies for any breach of this Agreement, but shall be in addition to all other remedies available at law or equity. | | FPD | |
| Each party recognizes that nothing in this Agreement is intended to limit any remedy of the other party. In addition, each party agrees that a violation of this Agreement could cause the other party irreparable harm and that any remedy at law may be inadequate. Therefore, each party agrees that the other party shall have the right to an order restraining any breach of this Agreement and for any other relief the non-breaching party deems appropriate, | 5 Remedies. The Company acknowledges that damages would not be an adequate remedy and that the Seller and the Target would be irreparably harmed if any of the provisions of this letter agreement are not performed strictly in accordance with their specific terms or are otherwise breached. Accordingly, you agree that each of the Seller and the Target is entitled, individually or together, to injunctive relief (or a similar remedy) to prevent breaches of this letter agreement and to specifically enforce its provisions in addition to any other remedy law or in equity. | | FPD | |

TABLE E-continued

| SUA | Original Text | Final Text | Edit Op. | ESUA |
|---|---|---|---|---|
| Each party recognizes that nothing in this Agreement is intended to limit any remedy of the other party. In addition, each party agrees that a violation of this Agreement could cause the other party irreparable harm and that any remedy at law may be inadequate. Therefore, each party agrees that the other party shall have the right to an order restraining any breach of this Agreement and for any other relief the non-breaching party deems appropriate, | Section 11. The Receiving Party acknowledges that the Confidential Information is a valuable asset of the Disclosing Party. The Receiving Party further acknowledges that the Disclosing Party shall incur irreparable damage if the Receiving Party should breach any of the provisions of this Agreement. Accordingly, if the Receiving Party breaches any of the provisions of this Agreement, the Disclosing party shall be entitled, without prejudice, to all the rights, damages and remedies available to it, including an injunction restraining any breach of the provisions of this Agreement by the Receiving Party or its agents or representatives. | | FPD | |

List Edit Type Alignment

In some embodiments where the edit type comprises a list edit type, an alignment method may be selected based on the list edit type.

As used herein, a leaf list may refer to an unstructured or non-enumerated list. One example of a leaf list is a list of nouns separated by a comma. In embodiments where there is a leaf list insert (LLI), the alignment method may comprise identifying a leaf list in the DUA, and tokenizing the leaf list into its constituent list items. The identified leaf list in the DUA is then compared to similar leaf lists in the training data of original texts. If a list item (e.g., in the case in table F below, "investor") is being inserted in the original text, and the list item is not already an item in the leaf list in the DUA, then the list item is inserted in the leaf list in the DUA. An example of this alignment method for a LLI edit operation is shown in Table F below.

TABLE F

| SUA | Original Text | Final Text | Edit Op. | ESUA |
|---|---|---|---|---|
| "Representatives" means directors, officers, employees, leaders, agents, financial advisors, consultants, contractors, attorneys and accountants of a Party or its Affiliate, | "Representative" means the directors, officers, employees, investment bankers, rating agencies, consultants, counsel, and other representatives of ADP or the Partner, as applicable. | "Representative" means the directors, officers, employees, investment bankers, investors, rating agencies, consultants, counsel, and other representatives of ADP or the Partner, as applicable. | LLI | "Representatives" means directors, officers, employees, leaders, agents, financial advisors, investors, consultants, contractors, attorneys and accountants of a Party or its Affiliate. |
| "Representatives" means directors, officers, employees, leaders, agents, financial advisors, consultants, contractors, attorneys and accountants of a Party or its Affiliate, | "Representatives" means the advisors, agents, consultants, directors, officers, employees and other representatives, including accountants, auditors, financial advisors, lenders and lawyers of a Party. | "Representatives" means the advisors, agents, consultants, directors, officers, employees and other representatives, including accountants, auditors, investors, financial advisors, lenders and lawyers of a Party. | LLI | "Representatives" means directors, officers, employees, leaders, agents, financial advisors, investors, consultants, contractors, attorneys and accountants of a Party or its Affiliate. |
| "Representatives" means directors, officers, employees, leaders, agents, financial advisors, consultants, contractors, attorneys and accountants of a Party or its Affiliate, | "Representatives" shall refer to all of each respective Party's partners, officers, directors, shareholders, employees, members, accountants, attorneys, independent contractors, temporary employees, agents or any other representatives or persons that may from time to time be employed, retained by, working for, or acting on behalf of, such Party. | "Representatives" shall refer to all of each respective Party's partners, officers, directors, shareholders, employees, members, accountants, investors, attorneys, independent contractors, temporary employees, agents or any other representatives or persons that may from time to time beemployed, retained by, working for, or acting on behalf of, such Party. | LLI | "Representatives" means directors, officers, employees, leaders, agents, financial advisors, investors, consultants, contractors, attorneys and accountants of a Party or its Affiliate. |
| "Representatives" means directors, officers, employees, leaders, agents, financial advisors, consultants, contractors, attorneys and accountants of a Party or its Affiliate, | "Representatives," with respect to a party hereto means the directors, officers, employees, advisors, consultants, bankers (investment and commercial), lawyers, engineers, landmen, geologists, geophysicists and accountants, of such party hereto | "Representatives," with respect to a party hereto means the directors, officers, employees, advisors, consultants, bankers (investment and commercial), investors, lawyers, engineers, landmen, geologists, geophysicists and accountants, of | LLI | "Representatives" means directors, officers, employees, leaders, agents, financial advisors, investors, consultants, contractors, attorneys and accountants of a Party or its Affiliate. |

TABLE F-continued

| SUA | Original Text | Final Text | Edit Op. | ESUA |
|-----|---------------|------------|----------|------|
|     | or any Affiliate of such party hereto. | such party hereto or any Affiliate of such party hereto. |  |  |

As another example, in embodiments where there is a leaf list deletion (LLD), the alignment method may comprise identifying a leaf list in the DUA and tokenizing the leaf list into its constituent list items. The identified leaf list in the DUA is then compared to similar leaf lists in the training data of original texts. If a list item (e.g., in the case in table G below, "employees") is being deleted from the original text, and the list item is already an item in the leaf list in the DUA, then the list item is deleted in the leaf list in the DUA.

An example of this alignment method for a LLD edit operation is shown in Table G below.

TABLE G

| SUA | Original Text | Final Text | Edit Op. | ESUA |
|-----|---------------|------------|----------|------|
| "Representatives" means directors, officers, employees, leaders, agents, financial advisors, consultants, contractors, attorneys and accountants of a Party or its Affiliate. | "Representative" means the directors, officers, employees, investment bankers, rating agencies, consultants, counsel, and other representatives of ADP or the Partner, as applicable, | "Representative" means the directors, officers, investment bankers, rating agencies, consultants, counsel, and other representatives of ADP or the Partner, as applicable. | LLD | "Representatives" means directors, officers, leaders, agents, financial advisors, consultants, contractors, attorneys and accountants of a Party or its Affiliate. |
| "Representatives" means directors, officers, employees, leaders, agents, financial advisors, consultants, contractors, attorneys and accountants of a Party or its Affiliate. | "Representatives" means the advisors, agents, consultants, directors, officers, employees and other representatives, including accountants, auditors, financial advisors, lenders and lawyers of a Party. | "Representatives" means the advisors, agents, consultants, directors, officers, and other representatives, including accountants, auditors, financial advisors, lenders and lawyers of a Party. | LLD | "Representatives" means directors, officers, leaders, agents, financial advisors, consultants, contractors, attorneys and accountants of a Party or its Affiliate. |
| "Representatives" means directors, officers, employees, leaders, agents, financial advisors, consultants, contractors, attorneys and accountants of a Party or its Affiliate, | "Representatives" shall refer to all of each respective Party's partners, officers, directors, shareholders, employees, members, accountants, attorneys, independent contractors, temporary employees, agents or any other representatives or persons that may from time to time be employed, retained by, working for, or acting on behalf of, such Party. | "Representatives" shall refer to all of each respective Party's partners, officers, directors, shareholders, members, accountants, attorneys, independent contractors, temporary employees, agents or any other representatives or persons that may from time to time be employed, retained by, working for, or acting on behalf of, such Party. | LLD | "Representatives" means directors, officers, leaders, agents, financial advisors, consultants, contractors, attorneys and accountants of a Party or its Affiliate. |
| "Representatives" means directors, officers, employees, leaders, agents, financial | "Representatives," with respect to a party hereto means the directors, officers, employees, advisors, consultants, | "Representatives," with respect to a party hereto means the directors, officers, advisors, consultants, bankers (investment and | LLD | "Representatives" means directors, officers, leaders, agents, financial advisors, consultants, contractors, |

TABLE G-continued

| SUA | Original Text | Final Text | Edit Op. | ESUA |
|---|---|---|---|---|
| advisors, consultants, contractors, attorneys and accountants of a Party or its Affiliate, | bankers (investment and commercial), lawyers, engineers, landmen, geologists, geophysicists and accountants, of such party hereto or any Affiliate of such party hereto. | commercial), lawyers, engineers, landmen, geologists, geophysicists and accountants, of such party hereto or any Affiliate of such party hereto. | | attorneys and accountants of a Party or its Affiliate. |

As used herein, a "structured list" may refer to a structured or enumerated list. For example, a structured list may comprise a set of list items separated by bullet points, numbers ((i), (ii), (iii) . . . ), letters ((a), (b), (c) . . . ), and the like. In some embodiments where the edit type comprises a structured list insert (SLI), an alignment method may be selected based on the SLI edit type. According to the alignment method, each SUA comprising a structured list is compared to semantically similar original texts comprising a structured list. The aligning may further comprise tokenizing the structured lists in the SUA and the original text into their constituent list items. If one of the original texts is labeled with an LII edit operation, then the system determines the best location for insertion of the list item and the list item is inserted in the SUA to arrive at an ESUA. In some embodiments, the best location for insertion may be chosen by putting the inserted item next to the item already in the list it is most frequently collocated with. In other embodiments, the base location for insertion may be based on weights between nodes in a Markov chain model of the list or other graphical model of the sequence. In some embodiments, if a single SUA triggers multiple LIIs, semantically similar LIIs may be clustered together so that multiple semantically similar LIIs are not applied to the same SUA.

An example of this alignment method for a SLI edit operation is shown in Table H below.

TABLE H

| SUA | Original Text | Final Text | Edit Op. | ESUA |
|---|---|---|---|---|
| (a) in the public domain at the time of receipt by the Receiving Party through no breach of this Agreement by the Receiving Party; (b) lawfully received by the Receiving Party from a third party; or (c) known by the Receiving Party at the time of receipt. | 4.1 prior to its disclosure was properly in Receiving Party's possession; or 4.2 is in the public domain through no fault of the Receiving party; or 4.3 was lawfully known to the Receiving Party prior to disclosure; or 4.4 is lawfully made available to the Receiving Party by a third party entitled to disclose such information, | 4.1 prior to its disclosure was properly in Receiving Party's possession; or 4.2 is in the public domain through no fault of the Receiving party; or 4.3 independently developed by or for the Receiving Party; or 4.4 was lawfully known to the Receiving Party prior to disclosure; or 4.5 is lawfully made available to the Receiving Party by a third party entitled to disclose such information. | SLI | (a) in the public domain at the time of receipt by the Receiving Party through no breach of this Agreement by the Receiving Party; (b) independently developed by or for the Receiving Party; (c) lawfully received by the Receiving Party from a third party; or (d) known by the Receiving Party at the time of receipt. |
| (a) in the public domain at the time of receipt by the Receiving Party through no breach of this Agreement by the Receiving Party; (b) lawfully received by the Receiving Party from a third party; or (c) | i.) Is publicly known at the time of Discloser's communication to Recipient or thereafter becomes publicly known through no violation of this Agreement; ii.) Was lawfully in Recipient's possession free of any obligation of confidence at the | i.) Is publicly known at the time of Discloser's communication to Recipient or thereafter becomes publicly known through no violation of this Agreement; ii.) Was lawfully in Recipient's possession free of any obligation of confidence at the time of Discloser's | SLI | (a) in the public domain at the time of receipt by the Receiving Party through no breach of this Agreement by the Receiving Party; (b) independently developed by or for the Receiving Party; (c) lawfully received by the Receiving Party from a third party; |

TABLE H-continued

| SUA | Original Text | Final Text | Edit Op. | ESUA |
|---|---|---|---|---|
| known by the Receiving Party at the time of receipt. | time of Discloser's communication to Recipient; or iii.) Is rightfully obtained by Recipient from a third party authorized to make such disclosure. | communication to Recipient; iii.) Is rightfully obtained by Recipient from a third party authorized to make such disclosure; or iv.) independently developed by or for the Recipient. | | or (d) known by the Receiving Party at the time of receipt. |
| (a) in the public domain at the time of receipt by the Receiving Party through no breach of this Agreement by the Receiving Party; (b) lawfully received by the Receiving Party from a third party; or (c) known by the Receiving Party at the time of receipt. | (a) is or becomes available to the public other than by breach of this Agreement by Recipient; (b) lawfully received from a third party without restriction on disclosure; (c) disclosed by the Discloser to a third party without a similar restriction on the rights of such third party; (d) already known by the Recipient without breach of this Agreement; or (e) approved in writing by the Discloser for public release or disclosure by the Recipient. | (a) is or becomes available to the public other than by breach of this Agreement by Recipient; (b) lawfully received from a third party without restriction on disclosure; (c) disclosed by the Discloser to a third party without a similar restriction on the rights of such third party; (d) already known by the Recipient without breach of this Agreement; (e) independently developed by or for the Receiving Party; or (f) approved in writing by the Discloser for public release or disclosure by the Recipient. | SLI | (a) in the public domain at the time of receipt by the Receiving Party through no breach of this Agreement by the Receiving Party; (b) independently developed by or for the Receiving Party; (c) lawfully received by the Receiving Party from a third party; or (d) known by the Receiving Party at the time of receipt. |

In embodiments where the edit type comprises a structured list deletion (SLD), the alignment method may compare the SUA to semantically similar original texts. If one of the original texts is labeled with an LII edit operation, then the best location for insertion of the list item is determined and the list item is inserted in the SAU to arrive at an ESUA.

In some embodiments, if a single SUA triggers multiple LIIs, semantically similar LIIs may be clustered together so that multiple semantically similar LIIs are not applied to the same SUA.

An example of this alignment method for a SLD edit operation is shown in table I below.

TABLE I

| SUA | Original Text | Final Text | Edit Op. | ESUA |
|---|---|---|---|---|
| (a) in the public domain at the time of receipt by the Receiving Party through no breach of this Agreement by the Receiving Party; (b) lawfully received by the Receiving Party from a third party; or (c) known by the Receiving Party at the time of receipt. | 4.1 prior to its disclosure was properly in Receiving Party's possession; or 4.2 is in the public domain through no fault of the Receiving party; or 4.3 was lawfully known to the Receiving Party prior to disclosure; or 4.4 is lawfully made available to the Receiving Party by a third party entitled to disclose such information. | 4.1 prior to its disclosure was properly in Receiving Party's possession; or 4.2 is in the public domain through no fault of the Receiving party; or 4.3 was lawfully known to the Receiving Party prior to disclosure. | SLD | (a) in the public domain at the time of receipt by the Receiving Party through no breach of this Agreement by the Receiving Party; or (b) known by the Receiving Party at the time of receipt. |
| (a) in the public domain at the time of receipt by the Receiving Party | i.) Is publicly known at the time of Discloser's communication to Recipient or | i.) Is publicly known at the time of Discloser's communication to Recipient or | SLD | (a) in the public domain at the time of receipt by the Receiving Party through no breach |

TABLE I-continued

| SUA | Original Text | Final Text | Edit Op. | ESUA |
|---|---|---|---|---|
| through no breach of this Agreement by the Receiving Party; (b) lawfully received by the Receiving Party from a third party; or (c) known by the Receiving Party at the time of receipt. | thereafter becomes publicly known through no violation of this Agreement; ii.) Was lawfully in Recipient's possession free of any obligation of confidence at the time of Discloser's communication to Recipient; or iii.) Is rightfully obtained by Recipient from a third party authorized to make such disclosure. | thereafter becomes publicly known through no violation of this Agreement; or ii.) Was lawfully in Recipient's possession free of any obligation of confidence at the time of Discloser's communication to Recipient. | | of this Agreement by the Receiving Party; or (b) known by the Receiving Party at the time of receipt. |
| (a) in the public domain at the time of receipt by the Receiving Party through no breach of this Agreement by the Receiving Party; (b) lawfully received by the Receiving Party from a third party; or (c) known by the Receiving Party at the time of receipt. | (a) is or becomes available to the public other than by breach of this Agreement by Recipient; (b) lawfully received from a third party without restriction on disclosure; (c) disclosed by the Discloser to a third party without a similar restriction on the rights of such third party; (d) already known by the Recipient without breach of this Agreement; or (e) approved in writing by the Discloser for public release or disclosure by the Recipient. | (a) is or becomes available to the public other than by breach of this Agreement by Recipient; (b) disclosed by the Discloser to a third party without a similar restriction on the rights of such third party; (c) already known by the Recipient without breach of this Agreement; or (d) approved in writing by the Discloser for public release or disclosure by the Recipient. | SLD | (a) in the public domain at the time of receipt by the Receiving Party through no breach of this Agreement by the Receiving Party; or (b) known by the Receiving Party at the time of receipt. |

Figure 8:
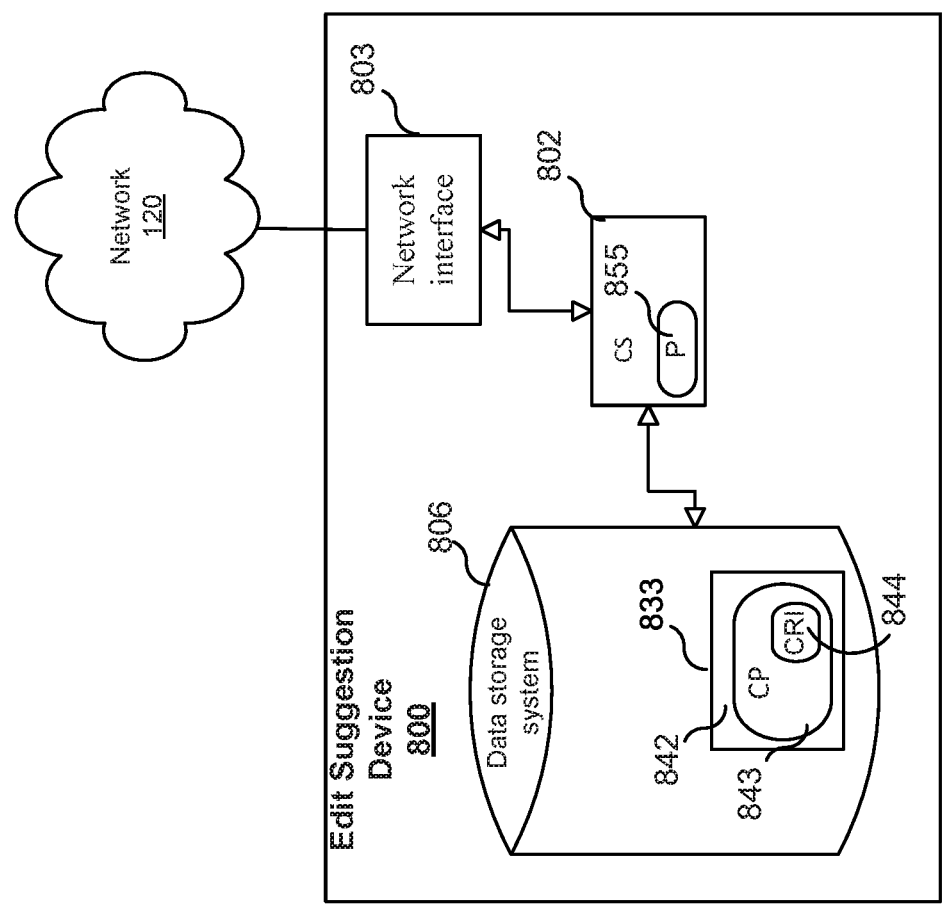
FIG. 8 is a block diagram illustrating an edit suggestion device, according to some embodiments.

FIG. 8 is a block diagram illustrating an edit suggestion device according to some embodiments. In some embodiments, device 800 is application server 101. As shown in FIG. 8, device 800 may comprise: a data processing system (DPS) 802, which may include one or more processors 855 (e.g., a general purpose microprocessor and/or one or more other data processing circuits, such as an application specific integrated circuit (ASIC), field-programmable gate arrays (FPGAs), and the like); a network interface 803 for use in connecting device 800 to network 120; and local storage unit (a.k.a., "data storage system") 806, which may include one or more non-volatile storage devices and/or one or more volatile storage devices (e.g., random access memory (RAM)). In embodiments where device 800 includes a general purpose microprocessor, a computer program product (CPP) 833 may be provided. CPP 833 includes a computer readable medium (CRM) 842 storing a computer program (CP) 843 comprising computer readable instructions (CRI) 844. CRM 842 may be a non-transitory computer readable medium, such as, but not limited to magnetic media (e.g., a hard disk), optical media (e.g., a DVD), memory devices (e.g., random access memory), and the like. In some embodiments, the CRI 844 of computer program 843 is configured such that when executed by data processing system 802, the CRI causes the device 800 to perform steps described herein (e.g., steps described above and with reference to the flow charts). In other embodiments, device 800 may be configured to perform steps described herein without the need for code. That is, for example, data processing system 802 may consist merely of one or more ASICs. Hence, the features of the embodiments described herein may be implemented in hardware and/or software.

Figure 9:
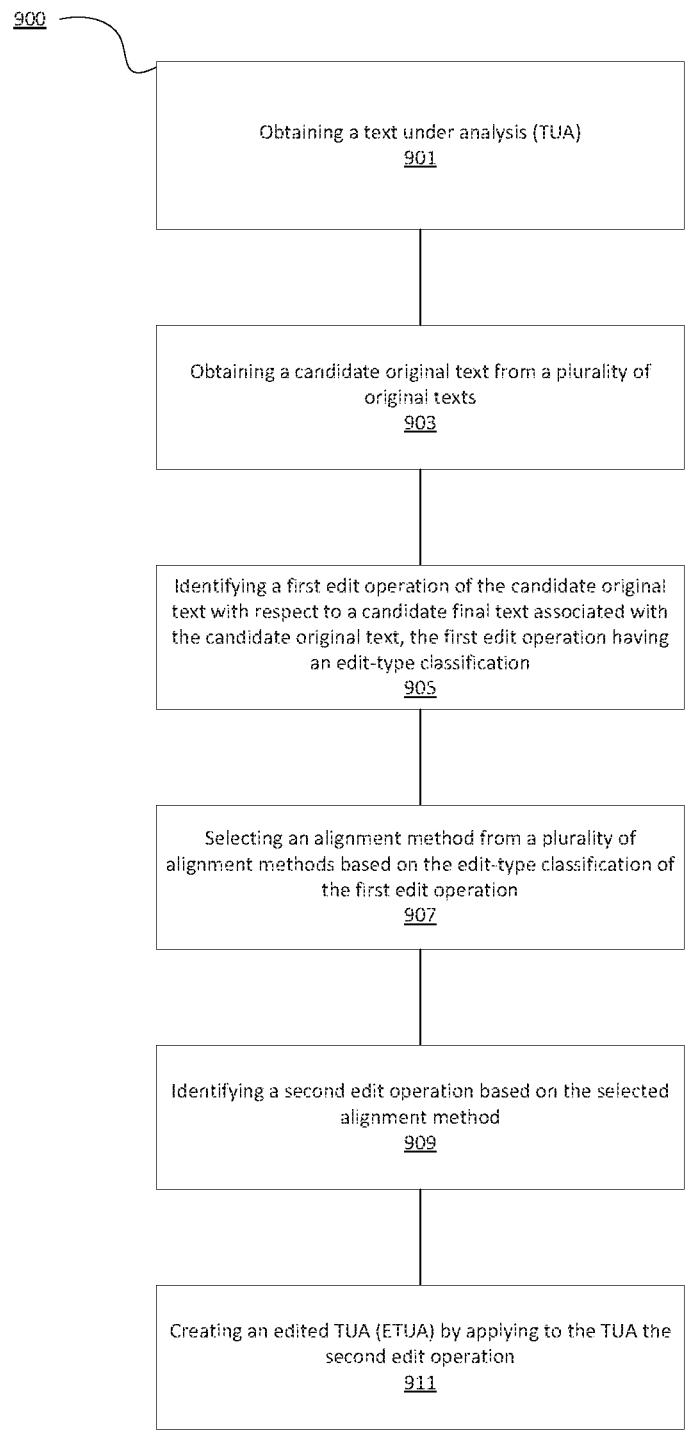
FIG. 9 is a method for suggesting revisions to text data, according to some embodiments.

FIG. 9 is a method for suggesting revisions to text data, according to some embodiments. In some embodiments, the method 900 may be performed by edit suggestion device 800 or system 100.

Step 901 comprises obtaining a text under analysis (TUA). In some embodiments, the TUA may be a document-under-analysis (DUA) or a subset of the DUA, such as a statement-under-analysis (SUA).

Step 903 comprises obtaining a candidate original text from a plurality of original texts. In some embodiments, step 903 may comprise obtaining a first original text from the seed database for comparison against a SUA as described above in connection with FIG. 3, step 310. As described above, different comparisons, or similarity metrics, may be determined based on an identified edit type in the first original text.

Step 905 comprises identifying a first edit operation of the candidate original text with respect to a candidate final text associated with the candidate original text, the first edit operation having an edit-type classification. As discussed above, an edit operation may comprise, for example, a deletion, insertion, or replacement of text data in the candidate original text as compared to its associated candidate final text. The edit-type classification may comprise, for example, a point edit, span edit, list edit, full edit (e.g., FSI/FSD/FPI/FPD), or a chunk edit.

Step 907 comprises selecting an alignment method from a plurality of alignment methods based on the edit-type classification of the first edit operation. For example, as described above, different alignment methods may be employed based on whether the edit type is a point, span, full, or list edit.

Step 909 comprises identifying a second edit operation based on the selected alignment method. In some embodiments, the second edit operation may be the same as the first edit operation of the candidate original text (e.g., insertion or deletion of the same or semantically similar text).

Step 911 comprises creating an edited TUA (ETUA) by applying to the TUA the second edit operation.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context. It will be apparent to those skilled in the art that various modifications and variations can be made in the method and system for suggesting revisions to an electronic document without departing from the spirit or scope of the invention. Thus, it is intended that embodiments of the invention cover the modifications and variations of this invention provided they come within the scope of the appended claims and their equivalents.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for suggesting revisions to text data, the method comprising:
    obtaining a text-under-analysis ("TUA");
    obtaining a candidate original text from a plurality of original texts;
    identifying a first edit operation of the candidate original text with respect to a candidate final text associated with the candidate original text, the first edit operation having an edit-type classification;
    selecting an alignment method from a plurality of alignment methods based on the edit-type classification of the first edit operation;
    identifying a second edit operation based on the selected alignment method; and
    creating an edited TUA ("ETUA") by applying to the TUA the second edit operation.

2. The method of claim 1, wherein obtaining the candidate original text from the plurality of original text further comprises:
    obtaining a first original text from the plurality of original texts;
    identifying a first edit operation of the first original text with respect to a first final text associated with the first original text, the first edit operation having a first edit-type classification;
    generating a first similarity score for the first original text based on the first edit-type classification, the first similarity score representing a degree of similarity between the TUA and the first original text;
    obtaining a second original text from the plurality of original texts;
    identifying a second edit operation of the second original text with respect to a second final text associated with the second original text, the second edit operation having a second edit-type classification;
    generating a second similarity score for the second original text based on the second edit-type classification, the second similarity score representing a degree of similarity between the TUA and the second original text; and,
    selecting the candidate original text from one of the first original text and the second original text.

3. The method of claim 1, wherein the edit-type classification comprises a point edit, and the selected alignment method comprises:
    aligning the TUA with the candidate original text; and
    determining a set of one or more edit operations to modify the TUA consistent with the first candidate final text associated with the first candidate original text, wherein the set of one or more edit operations comprises the second edit operation.

4. The method of claim 1, wherein the selected alignment method comprises:
    aligning a portion of the TUA with a portion of the candidate original text that is lexically different than the portion of the TUA based on a semantic similarity between the portion of the TUA and the portion of the candidate original text.

5. The method of claim 1, wherein the first edit operation is a deletion edit operation having a full edit type, and wherein the selected alignment method comprises:
    selecting a set of original texts from the plurality of original texts, wherein each original text in the set of original texts has a similarity score representing a degree of similarity between the TUA and the original text;
    creating a subset of original texts from the selected set of original texts, wherein each original text in the subset has a deletion edit operation having a full edit type classification with respect to each final text associated with each original text in the subset; and
    determining that the second edit operation is a deletion of the TUA based on the subset of original texts.

6. The method of claim 1, wherein the edit-type classification is a full edit type, and the alignment method comprises:
    obtaining a set of final texts, wherein each final text in the set is associated with an original text having a full edit type classification;
    obtaining a set of candidate edit operations of the full edit type classification from the set of final texts;
    selecting the second edit operation from the set of candidate edit operations, wherein the second edit operation is associated with a candidate final text; and
    aligning one or more features of the TUA with one or more features of the candidate final text.

7. The method of claim 6, wherein the second edit operation is an insertion, the method further comprising:
    determining that a text corresponding to the insertion edit operation is not located in the TUA or in a document under analysis comprising the TUA.

8. The method of claim 6, further comprising:
determining that a first portion of the text corresponding to the insertion edit operation is not located in the TUA or the document under analysis comprising the TUA; and,
determining that a second portion of the text corresponding to the insertion edit operation is located in the TUA or the document under analysis comprising the TUA, wherein
the second edit operation comprises inserting the first portion of text and not inserting the second portion of text.

9. The method of claim 1, wherein the edit-type classification is a span edit, and the alignment method comprises:
aligning a portion of the TUA with a portion of the candidate original text.

10. The method of claim 1, wherein the edit-type classification is a list edit, and the alignment method comprises:
tokenizing the TUA into a plurality of list items under analysis;
tokenizing the candidate final text into a plurality of candidate list items;
aligning each list item under analysis with each candidate list item; and
determining, based on the aligning, that the second edit operation comprises an insertion or deletion of a list item to the TUA.

11. A non-transitory computer readable medium storing instructions configured to cause a computer to perform the method of claim 1.

12. A system for suggesting revisions to text data, the system comprising:
a processor;
a non-transitory computer readable memory coupled to the processor, wherein the processor is configured to:
obtain a text-under-analysis ("TUA");
obtain a candidate original text from a plurality of original texts;
identify a first edit operation of the candidate original text with respect to a candidate final text associated with the candidate original text, the first edit operation having an edit-type classification;
select an alignment method from a plurality of alignment methods based on the edit-type classification of the first edit operation;
identify a second edit operation based on the selected alignment method; and
create an edited TUA ("TSUA") by applying to the TUA the second edit operation.

13. The system of claim 12, wherein the processor is further configured to:
obtain a first original text from the plurality of original texts;
identify a first edit operation of the first original text with respect to a first final text associated with the first original text, the first edit operation having a first edit-type classification;
generate a first similarity score for the first original text based on the first edit-type classification, the first similarity score representing a degree of similarity between the TUA and the first original text;
obtain a second original text from the plurality of original texts;
identify a second edit operation of the second original text with respect to a second final text associated with the second original text, the second edit operation having a second edit-type classification;
generate a second similarity score for the second original text based on the second edit-type classification, the second similarity score representing a degree of similarity between the TUA and the second original text; and,
select the candidate original text from one of the first original text and the second original text.

14. The system of claim 12, wherein the edit-type classification is a point edit, and the processor is further configured to:
align the TUA with the candidate original text; and
determine a set of one or more edit operations to modify the TUA consistent with the first candidate final text associated with the first candidate original text, wherein the set of one or more edit operations comprises the second edit operation.

15. The system of claim 12, wherein the processor is further configured to:
align a portion of the SUA with a portion of the candidate original text that is lexically different than the portion of the SUA based on a semantic similarity between the portion of the SUA and the portion of the candidate original text.

16. The system of claim 12, wherein the first edit operation is a deletion edit operation having a full edit type, and wherein the processor is further configured to:
select a set of original texts from the plurality of original texts, wherein each original text in the set of original texts has a similarity score representing a degree of similarity between the TUA and the original text;
create a subset of original texts from the set of original texts, wherein each original text in the subset has a deletion edit operation having a full edit type with respect to each final text associated with each original text in the subset; and
determine that the second edit operation is a deletion of the TUA based on the on the subset of original texts.

17. The system of claim 12, wherein the edit-type classification is a full edit type, and wherein the processor is further configured to:
obtain a set of final texts, wherein each final text in the set is associated with an original text having a full edit type classification;
obtain a set of candidate edit operations of the full edit type classification from the set of final texts;
select the second edit operation from the set of candidate edit operations, wherein the second edit operation is associated with a candidate final text; and
align one or more features of the TUA with one or more features of the candidate final text.

18. The system of claim 17, wherein the second edit operation is an insertion and wherein processor is further configured to:
determine that a text corresponding to the insertion is not located in the TUA or in a document under analysis comprising the TUA.

19. The system of claim 12, wherein the edit-type classification is a span edit and wherein the processor is further configured to:
align a portion of the TUA with a portion of the candidate original text.

20. The system of claim 12, wherein the edit-type classification is a list edit and wherein the processor is further configured to:

tokenize the TUA into a plurality of list items under analysis;
tokenize the candidate final text into a plurality of candidate list items;
align each list item under analysis with each candidate list item; and
determine, based on the alignment, that the second edit operation comprises an insertion or deletion of a list item to the TUA.

\* \* \* \* \*